United States Patent
Fröberg Olsson et al.

(10) Patent No.: US 9,119,125 B2
(45) Date of Patent: Aug. 25, 2015

(54) METHOD FOR MANAGING HANDOVER OF A USER EQUIPMENT

(75) Inventors: Jonas Fröberg Olsson, Ljungsbro (SE); Qiang Zhang, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 141 days.

(21) Appl. No.: 14/009,463

(22) PCT Filed: Apr. 6, 2011

(86) PCT No.: PCT/SE2011/050406
§ 371 (c)(1),
(2), (4) Date: Oct. 2, 2013

(87) PCT Pub. No.: WO2012/138268
PCT Pub. Date: Oct. 11, 2012

(65) Prior Publication Data
US 2014/0016617 A1 Jan. 16, 2014

(51) Int. Cl.
H04W 36/20 (2009.01)
H04W 36/00 (2009.01)
H04L 1/00 (2006.01)
H04L 1/18 (2006.01)

(52) U.S. Cl.
CPC .............. *H04W 36/20* (2013.01); *H04L 1/00* (2013.01); *H04L 1/1867* (2013.01); *H04W 36/00* (2013.01); *H04W 36/0016* (2013.01)

(58) Field of Classification Search
CPC .............. H04W 36/0005; H04W 36/0011; H04W 36/0016; H04W 36/20
See application file for complete search history.

(56) References Cited

U.S. PATENT DOCUMENTS

| 7,103,028 B1* | 9/2006 | Yasue et al. ............... 370/338 |
| 2009/0129335 A1* | 5/2009 | Lee et al. ............... 370/331 |

(Continued)

FOREIGN PATENT DOCUMENTS

| EP | 1973367 A2 | 9/2008 |
| EP | 2086253 A1 | 8/2009 |

OTHER PUBLICATIONS

3rd Generation Partnership Project. 3GPP TS 36.300 V9.2.0 (Dec. 2009). 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9). Dec. 2012.

(Continued)

*Primary Examiner* — Paul H Masur
*Assistant Examiner* — Kabir Jahangir
(74) *Attorney, Agent, or Firm* — Murphy, Bilak & Homiller, PLLC

(57) ABSTRACT

Methods and arrangements (600) in a first network node (120-1) for managing handover of a user equipment (110) from the first network node (120-1), to a second network node (120-2). The method and arrangement (600) comprises transmitting (501) a handover message to the user equipment (110), which handover message is triggering the user equipment (110) to perform the handover, and to establishing (502) a limit related to the amount of retransmissions to be made. Further the method and arrangement (600) comprises interrupting (503) scheduling of resources to the user equipment (110) and inhibiting further retransmissions of the handover message, when either the established limit is reached, or an indication that the user equipment (110) has left the first cell (130-1) is received. Also, methods and arrangements (800) in a in a second network node (120-2) are disclosed.

17 Claims, 14 Drawing Sheets

(56) References Cited

U.S. PATENT DOCUMENTS

| | | | | |
|---|---|---|---|---|
| 2009/0268689 | A1* | 10/2009 | Fu et al. | 370/331 |
| 2009/0286541 | A1* | 11/2009 | Maheshwari et al. | 455/436 |
| 2009/0318153 | A1 | 12/2009 | Maheshwari et al. | |
| 2010/0003981 | A1* | 1/2010 | Ahluwalia | 455/436 |
| 2010/0182952 | A1* | 7/2010 | Jeong et al. | 370/328 |
| 2010/0329214 | A1* | 12/2010 | Chun et al. | 370/331 |
| 2011/0250892 | A1* | 10/2011 | Gupta et al. | 455/437 |
| 2011/0281584 | A1* | 11/2011 | Sander et al. | 455/436 |
| 2012/0039260 | A1* | 2/2012 | Song et al. | 370/328 |
| 2012/0093128 | A1* | 4/2012 | Song et al. | 370/331 |
| 2013/0003648 | A1* | 1/2013 | Hahn et al. | 370/315 |

OTHER PUBLICATIONS

3rd Generation Partnership Project. 3GPP TS 36.331 V10.1.0 (Mar. 2011). 3rd Generation Partnership Project; Technical Specification Group Radio Access Network; Evolved Universal Terrestrial Radio Access (E-UTRA); Radio Resource Control (RRC); Protocol specification (Release 10). Mar. 2011.

Pacifico, D. et al, "Improving TCP Performance During the Intra LTE Handover," Global Telecommunications Conference. GLOBECOM 2009. IEEE. 2009, pp. 1-8.

Samsung, "UL Synchronized Handover," 3GPP TSG-RAN WG2#59; R2-073312; Aug. 20-24, 2007, pp. 1-6, Athens, Greece.

3rd Generation Partnership Project. 3GPP TS 36.213 V8.8.0 (Sep. 2009). 3rd Generation Partnership Project; Technical Specification Group Radio Access Network; Evolved Universal Terrestrial Radio Access (E-UTRA); Physical layer procedures (Release 8). Sep. 2009.

3rd Generation Partnership Project. 3GPP TS 36.331 V8.20.0 (Jun. 2013). 3rd Generation Partnership Project; Technical Specification Group Radio Access Network; Evolved Universal Terrestrial Radio Access (E-UTRA); Radio Resource Control (RRC); Protocol specification (Release 10). Jun. 2013.

* cited by examiner (Cont. on next page)

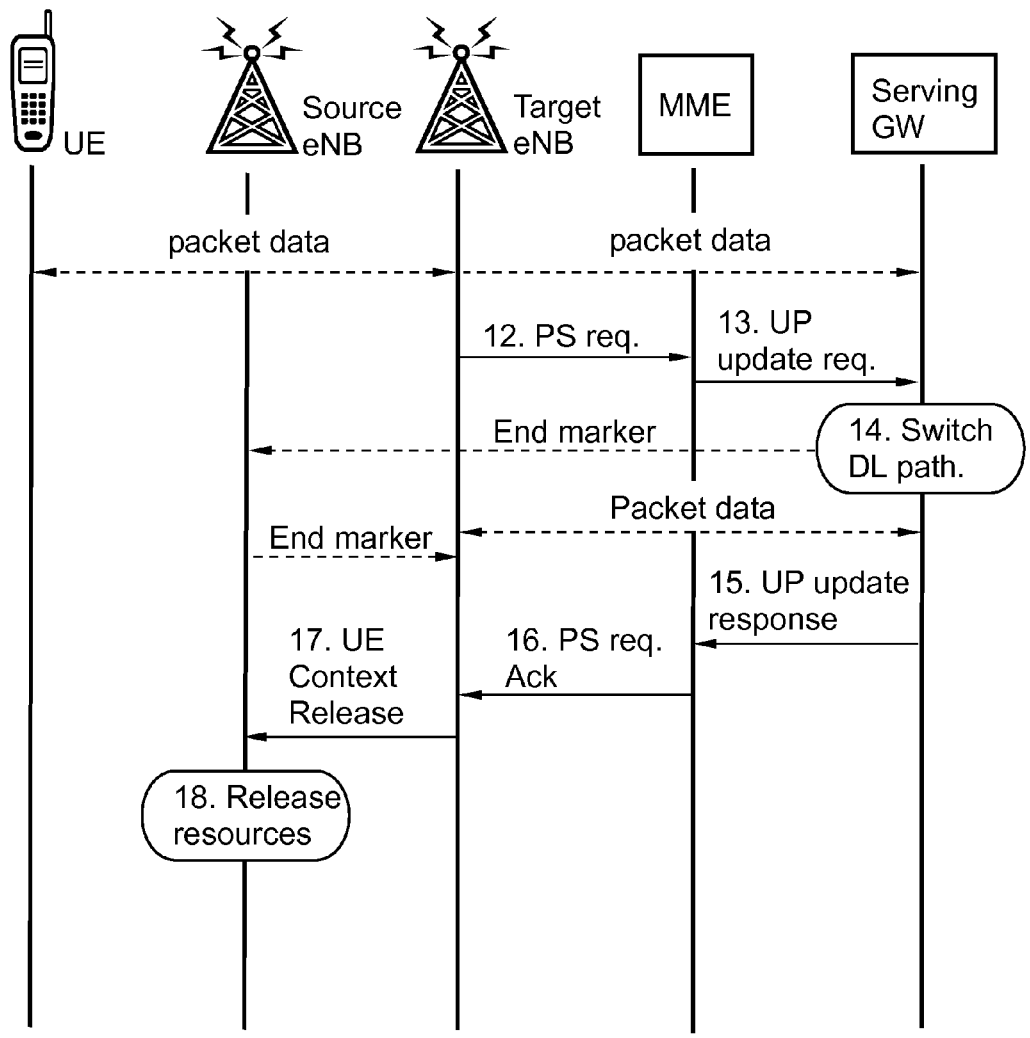
Fig. 1 (CONT. PRIOR ART)

METHOD FOR MANAGING HANDOVER OF A USER EQUIPMENT

TECHNICAL FIELD

This disclosure relates to a method and an arrangement in a first network node, and to a method and an arrangement in a second network node in a wireless communication system. Particularly, it relates to handover of a user equipment from the first network node, to a second network node.

BACKGROUND

Mobile stations (MS), also known as mobile terminals, wireless terminals and/or User Equipment (UE) are enabled to communicate wirelessly in a wireless communication system, sometimes also referred to as a cellular radio system. The communication may be made e.g. between two mobile stations, between a mobile station and a regular telephone and/or between a mobile station and a server via a Radio Access Network (RAN) and possibly one or more core networks.

The mobile stations may further be referred to as mobile telephones, cellular telephones, iPads, laptops or any other similar device with wireless capability. The mobile stations in the present context may be, for example, portable, pocket-storable, hand-held, computer-comprised, or vehicle-mounted mobile devices, enabled to communicate voice and/or data, via the radio access network, with another entity, such as another mobile station or a server.

The wireless communication system covers a geographical area which is divided into cell areas, with each cell area being served by a base station, e.g. a Radio Base Station (RBS), which in some networks may be referred to as "eNB", "eNodeB", "NodeB" or "B node", depending on the technology and terminology used. The base stations may be of different classes such as e.g. macro eNodeB, home eNodeB or pico base station, or relay node, based on transmission power and thereby also cell size. A cell is the geographical area where radio coverage is provided by the base station at a base station site. One base station, situated on the base station site, may serve one or several cells. The base stations communicate over the air interface operating on radio frequencies with the mobile stations within range of the base stations.

In some radio access networks, one or more base stations may be connected, e.g. by landlines or microwave, to a Radio Network Controller (RNC) e.g. in Universal Mobile Telecommunications System (UMTS). The Radio Network Controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

When a mobile station desires to access a wireless communication system such as e.g. a GSM, a WCDMA or an LTE system, it begins by sending random-access bursts to the nearest/strongest Radio Base Station. Depending on the distance to the Radio Base Station the bursts will arrive at the Radio Base Station more or less out of sync with the TDMA-frame structure of the Radio Base Station. To get the Mobile Station aligned with the TDMA frames the initial response from the GSM system contains a Timing Advance (TA) value. The Timing Advance value informs the Mobile Station of how much earlier the Mobile Station must transmit its bursts for them to arrive well synchronized to the Radio Base Station.

In a wireless communication system, or cellular mobile system as it also may be referred to, performing a handover (HO) from one cell to another is a critical task. When a handover decision is taken it is desirable that the handover time is as short as possible. Thus the handover is to be made as soon as possible following the reception of the Radio Resource Control (RRC) message triggering the handover, which may be before confirming successful reception Hybrid Automatic Repeat request/Automatic Repeat reQuest (HARQ/ARQ) of this message.

Considering X2 handover, FIG. 1 shows the control plane signalling. The RRC message triggering the handover is the RRC connection reconfiguration message, see Message 7 in FIG. 1. At reception of this message the user equipment is to perform the handover by switching to the target network node, or target eNB, as soon as possible. As the note above indicate this can be done by the user equipment without sending neither a Radio Link Control (RLC) status message for the RRC Package Data Unit (PDU) comprising the RRC connection reconfiguration message, nor a HARQ feedback for the transport block comprising the RRC connection reconfiguration message. The above means that the source network node, or source eNB, cannot know if the user equipment has successfully performed the handover until the UE context release message; see Message 17 in FIG. 1 is received from the target network node. This message informs the source network node that the user equipment successfully performed the handover. Until Message 17 is received source network node will, in case the user equipment leaves the cell without sending HARQ acknowledgement (ACK), continue sending HARQ retransmissions and RLC retransmissions trying to reach the user equipment, until predefined retransmission limits has been reached.

If the user equipment neither sends a HARQ feedback or RLC acknowledgement for the RRC message triggering the handover (Message 7 in FIG. 1), the source network node simply perform HARQ retransmissions and RLC retransmissions of the handover-message i.e., the handover-triggering RRC message. If the user equipment already performed the handover to a new cell it will get inter-cell interference from it source cell trying to reach it. This self-caused interference may potentially decrease the handover success rate.

FIG. 2 shows a scenario where the user equipment successfully performs a handover to a new cell while the old cell is still trying to reach the user equipment.

In the scenario, a handover has been made where the source network node (Sector 2) continues to transmit to the user equipment after the user equipment has entered the new cell (Sector 1). The x-axis shows the time in milliseconds. The y-axis shows the efficiency calculated from the modulation and coding scheme, as the code rate times the number of bits per modulation symbol summed for the transport blocks used (triangles). For each triangle there is a corresponding circle showing the reported efficiency, calculated from the reported rank and reported Channel Quality Index (CQI).

FIG. 3A show a scenario where the user equipment receives a handover command from the source network node (eNB), and performs the handover to the target network node, without transmitting any HARQ or RLC acknowledgement, to the source network node of the handover command. Thus the source network node continues re-transmitting the handover command, possibly until a UE Context Release message (message 17 in FIG. 1) is received from the target network node.

FIG. 3B show a scenario similar to the one illustrated in FIG. 3A. However, here the user equipment is sending a HARQ acknowledgement of the handover command to the source network node (eNB), but no RLC acknowledgement, why the source network node anyway continues retransmitting the handover command.

FIG. 3C illustrates a scenario where the user equipment is sending both a HARQ acknowledgement and a RLC acknowledgement of the handover command to the source network node (eNB).

Thus some user equipment, upon receiving a handover command may firstly send acknowledgements before starting the handover. However, some user equipment may start the handover without sending any acknowledgements, so the source network node could not know whether the user equipment did indeed send acknowledgements, but something went wrong in reception/transmission; or if the user equipment did not hear that it had message coming to it, thereby not being able to send any acknowledgements; or if the user equipment has successfully received the handover command and initiates handover without sending any acknowledgements.

Thereby, just in case, the source network node continues re-transmitting the handover command, thereby causing an increased exposure for intra cell interference. Also, by keeping resources scheduled for user equipment which are no longer present in the cell, the transmission capacity of the system is decreased.

However, as a handover typically is performed at the cell edge, where the signal propagation conditions may be somewhat detoriated, the user equipment would experience an increased risk of being disconnected if no retransmissions at all would be performed by the source network node in the described scenario.

SUMMARY

It is an object to obviate at least some of the above disadvantages and provide an improved performance within a wireless communication system.

According to a first aspect, the object is achieved by a method in a first network node in a wireless communication system. The method aims at managing handover of a user equipment from the first network node, to a second network node when the user equipment is moving from a first cell, defined by the first network node, into a second cell, defined by the second network node. The method comprises transmitting a handover message, to be received by the user equipment. The handover message is triggering the user equipment to perform a handover from the first network node, to the second network node. Further, the method comprises detecting that no acknowledgment message has been received from the user equipment, for the transmitted handover message. Also, as a consequence, the method further comprises retransmitting the handover message, to be received by the user equipment. The method in addition comprises inhibiting further retransmission of the handover message and interrupting scheduling of resources to the user equipment. This is made under the precondition of either a preliminary indication message, indicating that the user equipment has left the first cell and appeared in the second cell, is received; or a first limit related to an amount of retransmission to be made of the transmitted handover message, which first limit is lower than any other limit related to the amount of retransmission to be made of any other message, not being a handover message is reached. Thereby may the inhibition of further retransmission and interruption of scheduling of resources to the user equipment be enabled, before receiving a confirmation from the second network node, confirming that the user equipment has successfully completed the handover.

According to a second aspect, the object is achieved by an arrangement in a first network node in a wireless communication system. The arrangement aims at managing handover of a user equipment from the first network node, to a second network node when the user equipment is moving from a first cell, defined by the first network node, into a second cell, defined by the second network node. The arrangement comprises a transmitter, configured to transmit a handover message to be received by the user equipment. The handover message is triggering the user equipment to perform a handover from the first network node, to the second network node. Further, the arrangement also comprises a processing circuit. The processing circuit is configured to detect that no acknowledgment message has been received from the user equipment for the transmitted handover message. Further, the processing circuit is configured to inhibit further retransmission of the handover message and interrupt scheduling of resources to the user equipment if a condition is fulfilled. The condition to be fulfilled may comprise receiving a preliminary indication message, indicating that the user equipment has left the first cell and appeared in the second cell. However, the condition to be fulfilled may comprise a first limit related to an amount of retransmission to be made of the transmitted handover message, which first limit is lower than any other limit related to the amount of retransmission to be made of any other message, not being a handover message, is reached. Further, the arrangement also comprises a receiver. The receiver is configured to receive a preliminary indication message, indicating that the user equipment has left the first cell and appeared in the second cell. Thereby may the inhibition of further retransmission and interruption of scheduling of resources to the user equipment be enabled, before receiving a confirmation from the second network node, confirming that the user equipment has successfully completed the handover.

According to a third aspect, the object is achieved by a method in a second network node in a wireless communication system. The method aims at facilitating handover of a user equipment from a first network node, to the second network node when the user equipment is moving from a first cell, defined by the first network node, into a second cell, defined by the second network node. The method comprises detecting that the user equipment has appeared in the second cell. Further, the method also comprises transmitting a preliminary indication message to be received by the first network node. The preliminary indication message indicates that the user equipment has appeared in the second cell and triggers the first network node to inhibit any retransmission of any handover message to the user equipment and interrupt scheduling of resources to the user equipment. This is made before sending a confirmation of a successfully made handover of the user equipment from the first network node, to the second network node.

According to a fourth aspect, the object is achieved by an arrangement in a second network node in a wireless communication system. The arrangement is configured for handover of a user equipment from a first network node, to the second network node when the user equipment is moving from a first cell, defined by the first network node, into a second cell, defined by the second network node. The arrangement comprises a processing circuit. The processing circuit is configured to detect that the user equipment has appeared in the second cell. In addition, the arrangement comprises a transmitter. The transmitter is configured to transmit a preliminary indication message to be received by the first network node. The preliminary indication message is in turn configured to trigger the first network node to inhibit any retransmission of any handover message to the user equipment, and interrupt scheduling of resources to the user equipment. The preliminary indication message is transmitted before sending a confirmation of a successfully made handover of the user equipment from the first network node, to the second network node.

According to some embodiments of the methods and arrangements herein, an acknowledgement of a handover command transmitted to a user equipment may be received, or not received. Since a HARQ feedback decoding, or acknowledgement, may be either decodable (i.e. either ACK or NACK) or not-detectable, a not-detected HARQ feedback may with a relatively high probability be due to that the user equipment did not transmit the HARQ feedback, but just made the handover without sending any acknowledgement.

Embodiments of the methods and arrangements, thanks to the distinguishing features of the disclosed independent claims, render it possible to reduce inter-cell interference experienced by the user equipment when entering a new cell by limiting the retransmissions of the handover message from the first network node to be received by the user equipment. Further, according to some embodiments the radio resources in the first network node are freed since unnecessary transmissions to non-present user equipment is avoided, or at least reduced. Thereby an improved performance within the wireless communication system is provided.

Thus, thanks to embodiments of the present methods and arrangements, the amount and/or time period of un-necessary re-transmissions of handover commands are reduced or even eliminated, which render a reduced risk of interference.

Other objects, advantages and novel features will become apparent from the following detailed description.

BRIEF DESCRIPTION OF THE DRAWINGS

The herein disclosed methods and arrangements are described in more detail with reference to the appended drawings, illustrating exemplary embodiments and in which.

DETAILED DESCRIPTION

It is herein disclosed a method and an arrangement in a first network node and also a method and an arrangement in a second network node in a wireless communication system, which may be put into practice in the embodiments described below. Those methods and arrangements may, however, be embodied in many different forms and are not to be considered as limited to the embodiments set forth herein; rather, these embodiments are provided so that this disclosure will be thorough and complete.

Still other features and advantages of embodiments of the present methods and arrangements may become apparent from the following detailed description considered in conjunction with the accompanying drawings. It is to be understood, however, that the drawings are designed solely for purposes of illustration and not as a definition of the limits of the present methods and arrangements. It is further to be understood that the drawings are not necessarily drawn to scale and that, unless otherwise indicated, they are merely intended to conceptually illustrate the structures and procedures described herein.

Figure 4A:
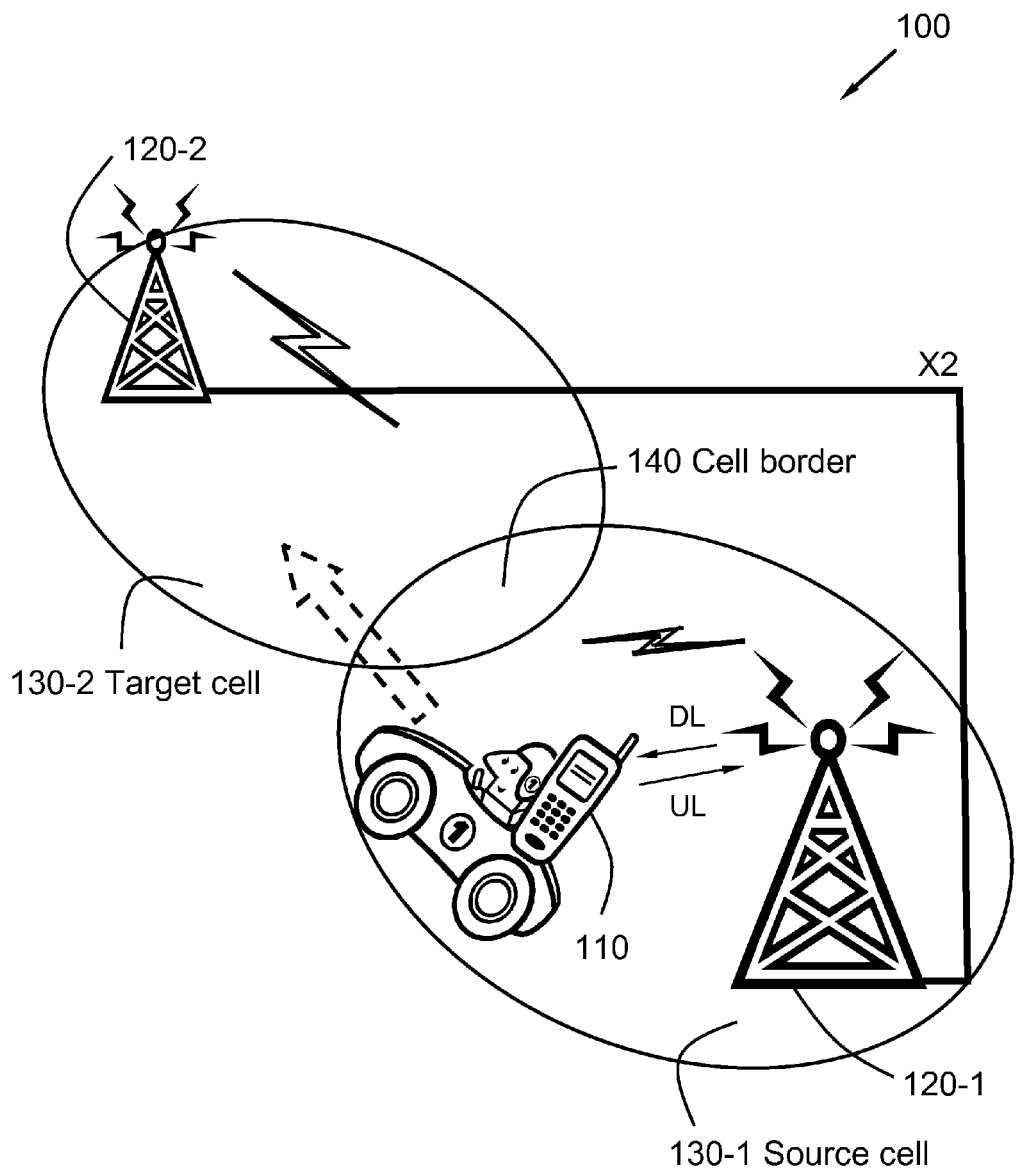
FIG. 4A is a schematic block diagram illustrating a wireless communication system according to some embodiments.

FIG. 4A depicts a wireless communication system 100. The wireless communication system 100 may, according to some embodiments, at least partly be based on radio access technologies such as e.g. 3rd Generation Partnership Project (3GPP) Long Term Evolution (LTE), LTE-Advanced, Evolved Universal Terrestrial Radio Access Network (E-UTRAN), UMTS, GSM/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), just to mention some few options.

The wireless communication system 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a guard period situated in the time domain between the uplink and downlink signalling. FDD means that the transmitter and receiver operate at different carrier frequencies. The purpose of the illustration in FIG. 4A is to provide a simplified, general overview of the present method and the functionalities involved. The present methods and arrangements will as a non-limiting example be described in a 3GPP LTE environment.

The wireless communication system 100 comprises a first network node 120-1, a second network node 120-2, and a user equipment 110, arranged to communicate with each other. The user equipment 110 is situated in a source cell 130-1, defined by the first network node 120-1, and is moving towards a target cell 130-2, defined by the second network node 120-2. The user equipment 110 is configured to transmit radio signals comprising information data to be received by the network nodes 120-1, 120-2. Contrariwise, the user equipment 110 is configured to receive radio signals comprising information data transmitted by the network nodes 120-1, 120-2.

In the present context, the expression downlink (DL) is used for the transmission path from the network nodes 120-1, 120-2 to the user equipment 110. The expression uplink (UL) is used for the transmission path in the opposite direction i.e. from the user equipment 110 to the network nodes 120-1, 120-2.

The transmission of signals between the user equipment 110 and the network nodes 120-1, 120-2 may be made on a carrier. A frame is subdivided into timeslots, which may be allocated for either uplink or downlink transmission.

It is to be noted that the illustrated setting of user equipment 110 and network nodes 120-1, 120-2 in FIG. 4A is to be regarded as a non-limiting exemplary embodiment only. The wireless communication system 100 may comprise any other number and/or combination of user equipment 110 and network nodes 120-1, 120-2. For example may the network nodes 120-1, 120-2 be connected to, comprise or be in conjunction with, a base station controller (BSC), according to some embodiments. The base station controller may e.g. handle allocation of radio channels, receive measurements from the user equipment 110, and control handovers to and/or from the network nodes 120-1, 120-2, to mention some possible examples. Such base station controller may be connected to a plurality of network nodes 120-1, 120-2 within the wireless communication system 100. Further, a Radio Base Station and Base Station Controller may both, or together, be referred to as a network node 120-1, 120-2 within the context of the present methods and arrangements.

The network nodes 120-1, 120-2 may be referred to as e.g. Radio Base Station (RBS), base station, NodeB, evolved Node B (eNB, or eNode B), base transceiver station, Access Point Base Station, base station router, macro base station, micro base station, pico base station, femto base station, Home eNodeB, relay and/or repeater, sensor, beacon device or any other network node configured for communication with the user equipment 110 over a wireless interface, depending e.g. of the radio access technology and terminology used. In the rest of the disclosure, the term "network node" will be used for the network nodes 120-1, 120-2, in order to facilitate the comprehension of the present methods.

The user equipment 110 may be represented by e.g. a wireless communication terminal, a mobile cellular phone, an iPad, a Personal Digital Assistant (PDA), a wireless platform, a user equipment unit (UE), a portable communication device, a laptop, a computer or any other kind of device configured to communicate wirelessly with the network node 120-1, 120-2.

The network node 120-1, 120-2 controls the radio resource management within the respective cells 130-1, 130-2, such as e.g. allocating radio resources to the user equipment 110 within the cells 130-1, 130-2 and ensuring reliable wireless communication links between the network node 120-1, 120-2 and the user equipment 110.

Embodiments of the presently described methods and arrangements aim at managing handover of the user equipment 110 from the first network node 120-1, to the second network node 120-2 when the user equipment 110 is moving from the first cell 130-1, defined by the first network node 120-1, into a second cell 130-2, defined by the second network node 120-2; usually at the cell border 140 between the source cell 130-1 and the target cell 130-2.

Further, according to some embodiments a special treatment of the handover-message that may involve several layer 2 functions such as scheduling, HARQ re-transmissions and RLC functionality.

In the context herein, HARQ may be seen as part of the ARQ family. However, according to some embodiments, HARQ may further be seen as a combination of forward error-correcting code+stop-and-wait ARQ.

Automatic Repeat reQuest (ARQ), also known as Automatic Repeat Query, is an error-control method for data transmission that uses acknowledgements and timeouts to achieve reliable data transmission over an unreliable service. The types of ARQ protocols comprises Stop-and-wait ARQ, Go-Back-N ARQ, and Selective Repeat ARQ.

In a standard-blocking embodiment, the standard is assumed to be changed so that the user equipment 110 may at least transmit a HARQ feedback when successfully received the handover-message. This case involves the smallest change since then the network node 120-1 may monitor the HARQ feedback for the transmission(s) of the handover message.

In a standard-compliant embodiment, the network node 120-1 monitors decoding attempts of the HARQ feedback. Since a HARQ feedback decoding may be either decodable (either ACK or NACK) or not-detectable. A not-detected HARQ feedback is with a relatively high probability due to the user equipment 110 did not transmit the HARQ feedback. This may happen if the user equipment 110 could not successfully decode the Physical Downlink Control Channel (PDCCH), but that may be a consequence of that the user equipment 110 simply has performed the handover, in an LTE environment.

In another embodiment, the target network node 120-2 may notify via X2 interface the source network node 120-1 that the user equipment 110 successfully performed the handover. This embodiment may be either standard-blocking if the signalling between the target network node 120-2 and the source network node 120-1 is standardized, or standard-compliant if the signalling is proprietary.

In yet another embodiment, the target network node 120-2 may notify the source network node 120-1 that the user equipment 110 has appeared in the target cell 130-2.

When the user equipment 110 enters the target cell 130-2, it may use the random access procedure. In case of handover there may be two possibilities:

First option: The target network node 120-2 allocates a dedicated Random Access preamble that the user equipment 110 may use when performing the Random Access. Since the preamble is dedicated, the target network node 120-2 knows that it is the (handover) user equipment 110 that tries to access the target network node 120-2.

Second option: The target network node 120-2 does not allocate a dedicated Random Access preamble. This means that the target network node 120-2 does not know for sure that it is the (handover) user equipment 110 that is doing the Random Access.

In some embodiments, which may be considered as Standard-blocking, the user equipment 110 may be required to send a HARQ feedback/acknowledgement when receiving the handover message from the source network node 120-1. Thus a standard change may be assumed according to those embodiments that disallow the user equipment 110 from entering the target cell 130-2, without sending a HARQ acknowledgement for the RRC message that triggered the handover if it was successfully receiving.

The source network node 120-1 may trigger special handling of the handover message i.e., the RRC message triggering the handover, in comparison with other transmitted messages and/or signalling, due to the nature of the handover message. In particular, the source network node 120-1 may monitor the HARQ feedback for transport block(s) carrying the handover message. If an acknowledgement is received for the transport block(s), the source network node 120-1 may stop schedule the user equipment 110, since it has likely performed a successful handover.

However, according to some embodiments, the user equipment 110 may not send any HARQ feedback for the handover message, according to some Standard-compliant embodiments.

The HARQ feedback may be either decodable i.e. comprising either an acknowledgement (ACK) or a non-acknowledgement (NACK), or not-detectable. A not-detected HARQ feedback may with some probability be considered due to that the user equipment 110 received the handover message and performed the handover but did not transmit any HARQ feedback.

According to those embodiments, this fact may be utilized as a preliminary indication or presumption of a successful handover performed by the user equipment 110. After the source network node 120-1 has transmitted the handover message it may monitor the decoding results of the corresponding HARQ feedback. If HARQ feedback was received and decoded successfully as an acknowledgement, ACK, the source network node 120-1 may stop schedule the user equipment 110 since successful handover has likely occurred. If the decoding result was a non acknowledgement, NACK, the source network node 120-1 may continue normal operation. If, however, the decoding result is not-detected, the source network node 120-1 may stop schedule the user equipment 110 according to some embodiments.

The special treatment of the handover message described above may be combined with a limitation such as e.g. a timer or similar, to make the method robust regarding PDCCH decoding failures. In those embodiments, when a not-detected HARQ feedback is received for the handover message, the timer may be started and until the timer is expired the source network node 120-1 may continue its normal operation i.e., continue retransmission of the handover message. When the timer expires, the user equipment 110 may be considered either as lost or considered to having successfully performed the handover. If, however, a HARQ feedback (i.e., ACK or NACK) for a retransmission of the handover message is received and detected, the timer may be stopped (canceled), according to some embodiments. Those embodiments will be further discussed and explained in more detail in conjunction with FIG. 4E.

According to some alternative embodiments which also may be considered Standard-compliant, the user equipment 110 may not send any HARQ feedback for the handover message. Thus the source network node 120-1 may trigger the RLC to use fewer retransmission attempts for the handover message. Those embodiments alone may not be able to avoid the HARQ retransmissions of the handover message, but may avoid the RLC retransmission attempts of the handover message. Those embodiments will be further discussed and explained in more detail in conjunction with FIG. 4D.

Figure 1:
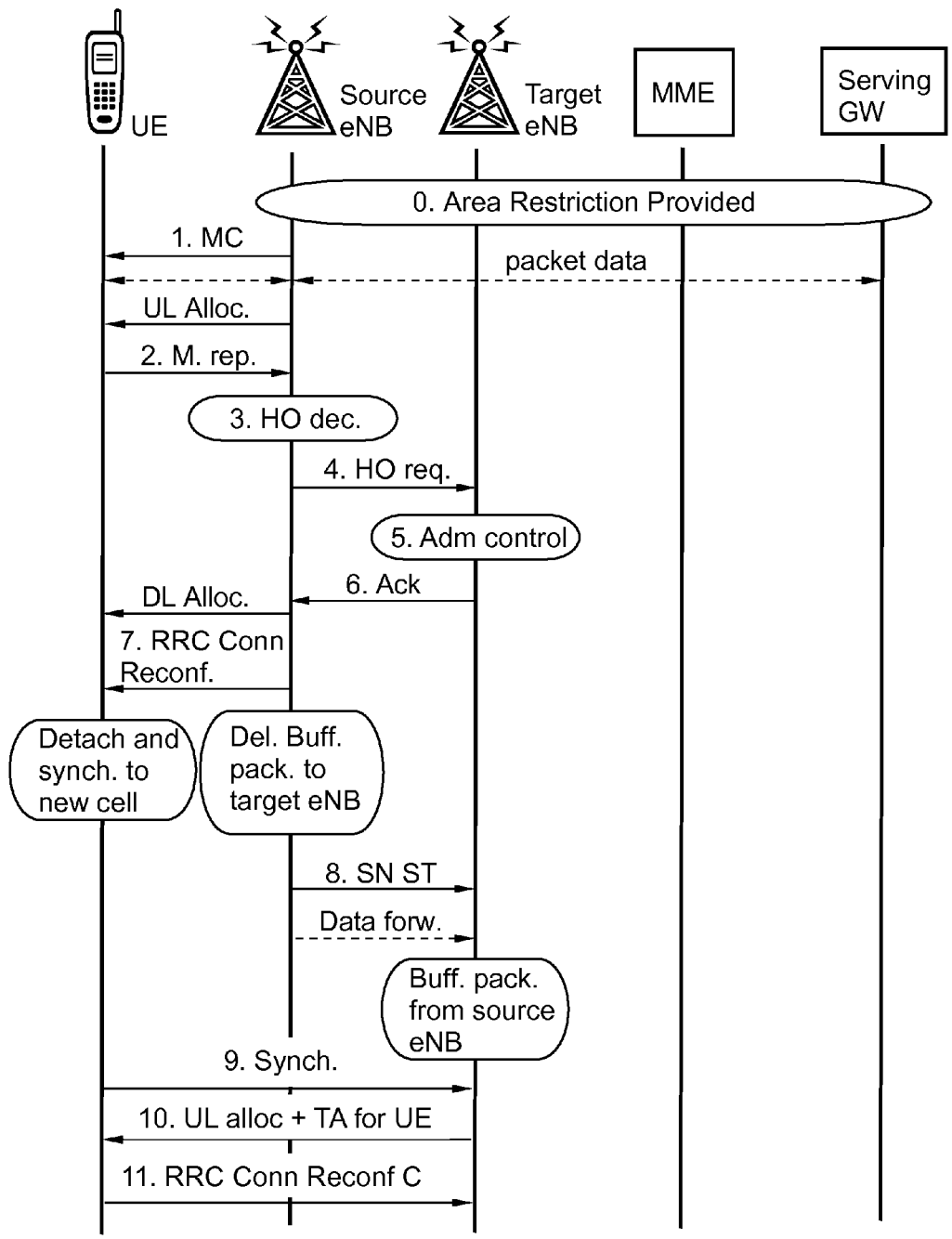
FIG. 1 is a combined block diagram and flow chart illustrating communication in a wireless communication system according to prior art.
Figure 2:
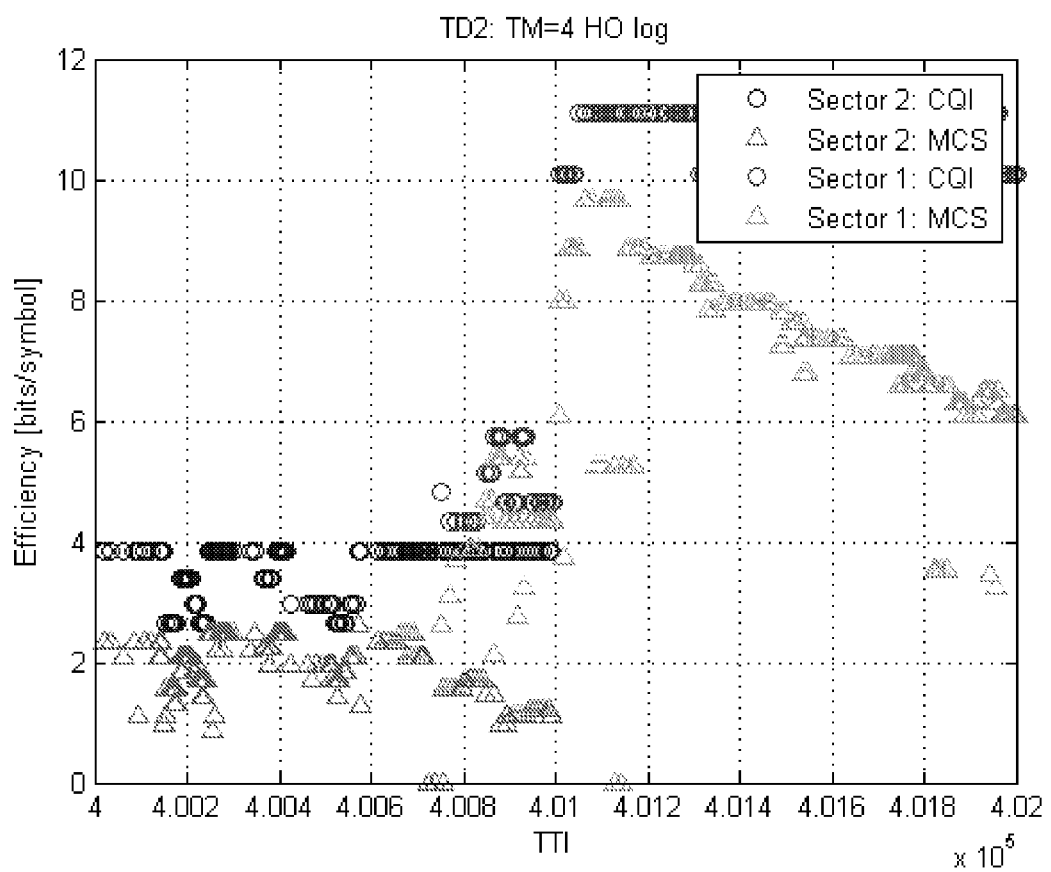
FIG. 2 is an illustrated scenario, where a user equipment successfully performs a handover to a target cell while the source cell still trying to reach the user equipment, according to prior art.
Figure 3A:
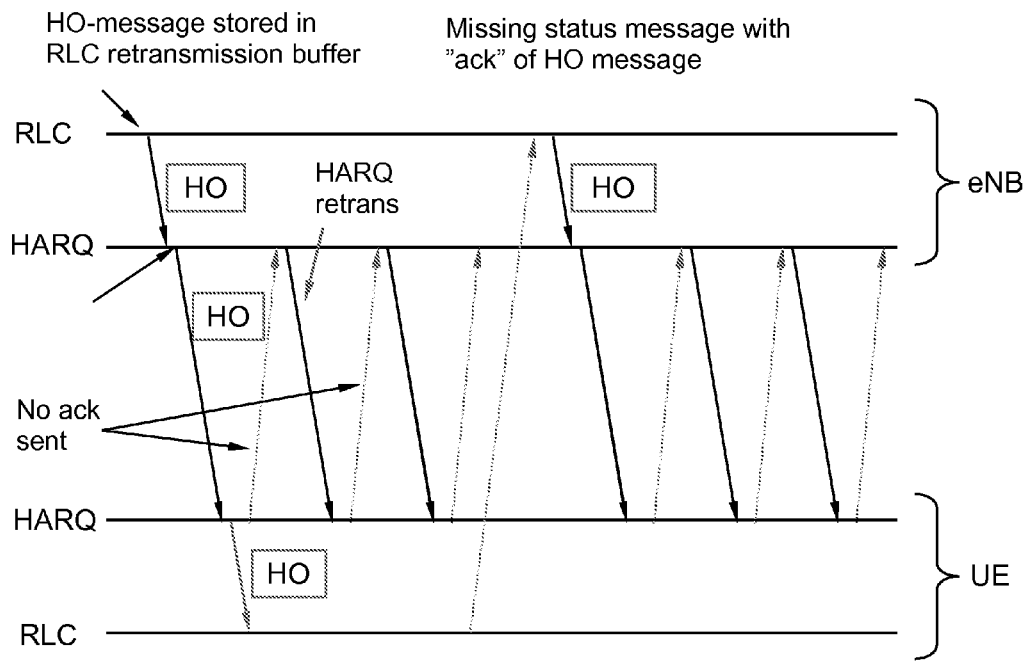
FIG. 3A is a combined block diagram and flow chart illustrating drawbacks of the prior art, in which no acknowledgement is sent.
Figure 3B:
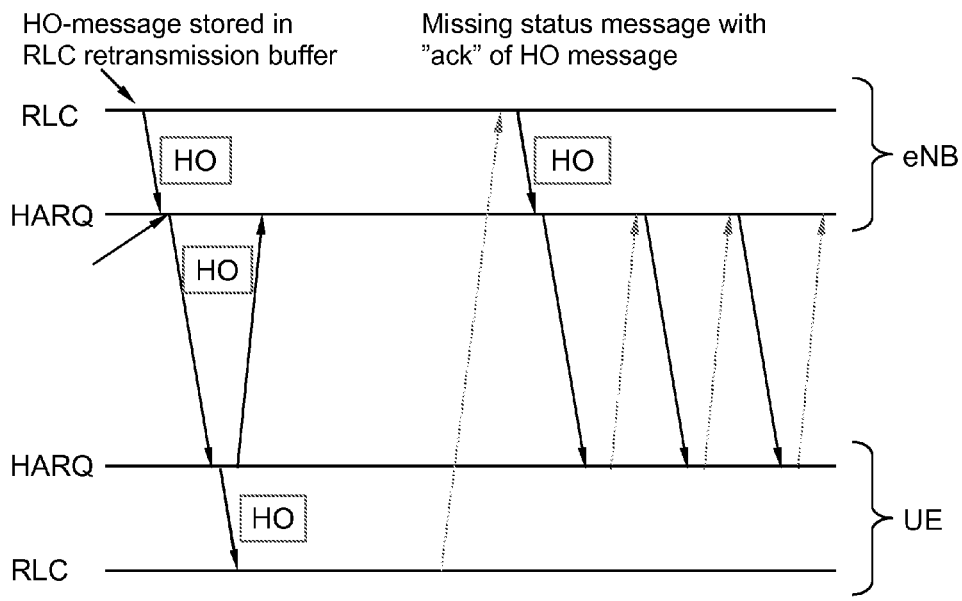
FIG. 3B is a combined block diagram and flow chart illustrating drawbacks of the prior art wherein insufficient number of acknowledgement is sent.
Figure 3C:
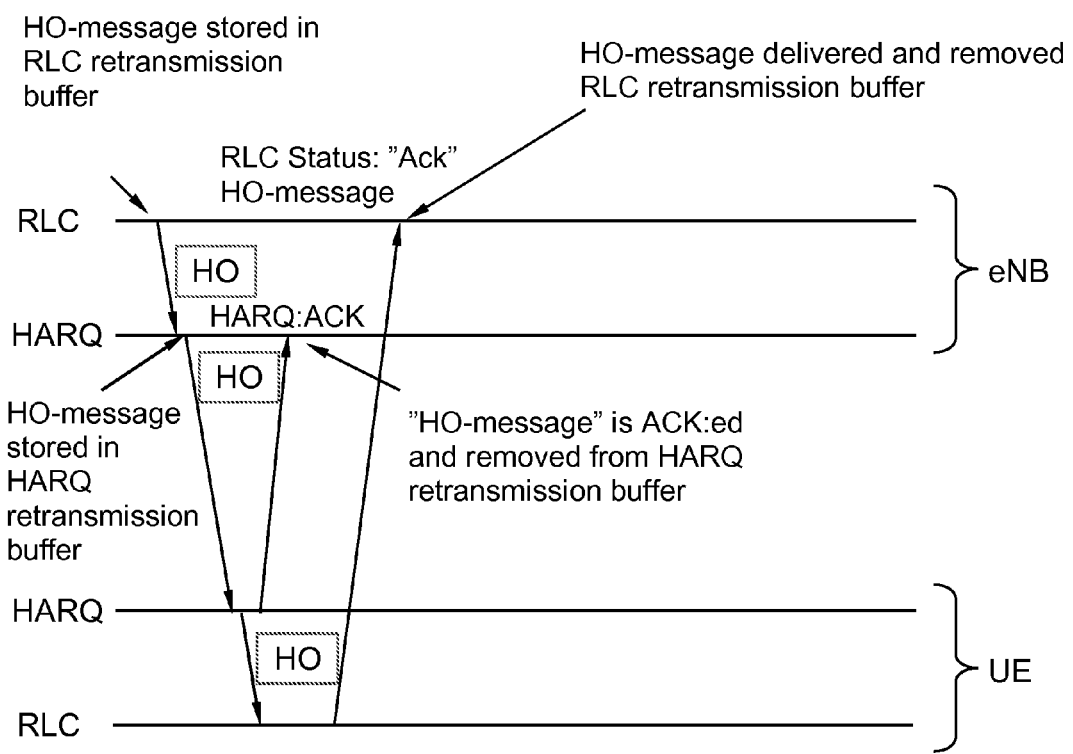
FIG. 3C is a combined block diagram and flow chart illustrating drawbacks of the prior art wherein acknowledgement is sent.
Figure 4B:
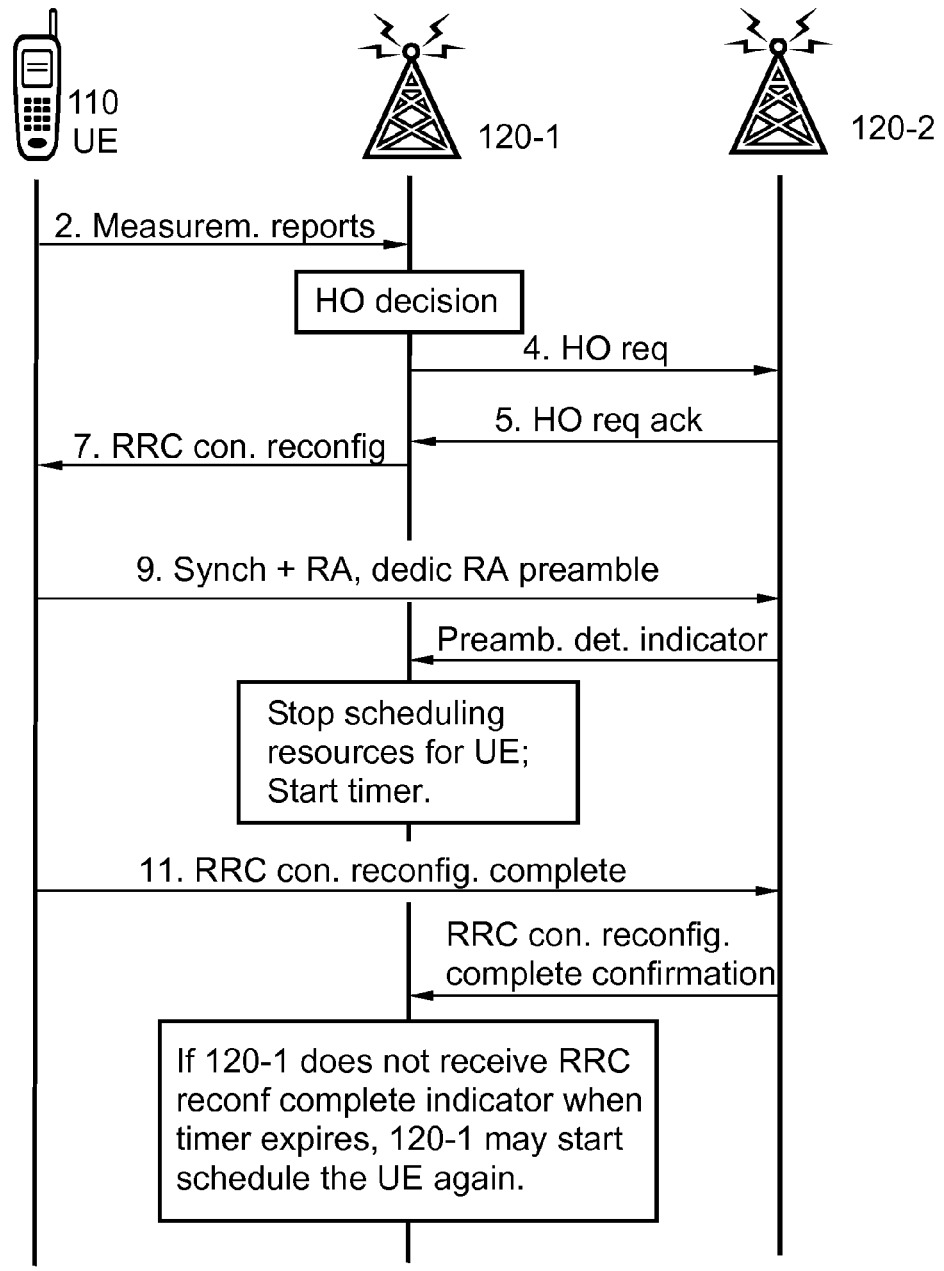
FIG. 4B is a combined block diagram and flow chart illustrating embodiments of the methods.

FIG. 4B illustrates an exemplary embodiment of the method in a wireless communication system 100, in case of dedicated Random Access preamble. The messages 2, 4, 5, 7 and 9 are the same as previously described when FIG. 1 was discussed. However, a preamble detection indicator may in addition be transmitted from the target network node 120-2 to the source network node 120-1. The preamble detection indicator may then tell the source network node 120-1 to stop schedule the user equipment 110.

The reason for transmitting two messages from the target network node 120-2 to the source network node 120-1 according to some embodiments is that the first message, comprising a first preliminary indication that the user equipment 110 has appeared when receiving Random Access preamble does not provide 100% assurance that it is the user equipment 110 that entered the target cell 130-2. This is due to that that there may be false detection of Random Access preambles. However, when the target network node 120-2 receives the "RRC connection reconfiguration complete" message, it knows for sure that is the user equipment 110, and that the handover is completed.

In message 4, the handover request, the source network node 120-1 may send its identifier of the user equipment 110 it will use in the communication between the source network node 120-1 and the target network node 120-2. When the target network node 120-2 sends the "HO request ack" message it may attach both the UE identifier used by the source network node 120-1 and the UE identifier used by the target network node 120-2 itself. In message 5, handover request acknowledgement, the target network node 120-2 may also send the dedicated Random Access preamble, according to some embodiments.

In case the target network node 120-2 does not use a dedicated Random Access preamble, the message "Preamble detection indicator" may be skipped and the trigger for the source network node 120-1 to stop schedule the user equipment 110 may be the "RRC reconfiguration complete indicator" message according to some embodiments. It is, however, also possible to keep the message, but the probability that it is indeed the (handover) user equipment 110 that performed the Random Access is lower. It may be emphasized that it is possible to have either one, or both, of the messages for each of the possibilities mentioned above, according to different embodiments.

Figure 4C:
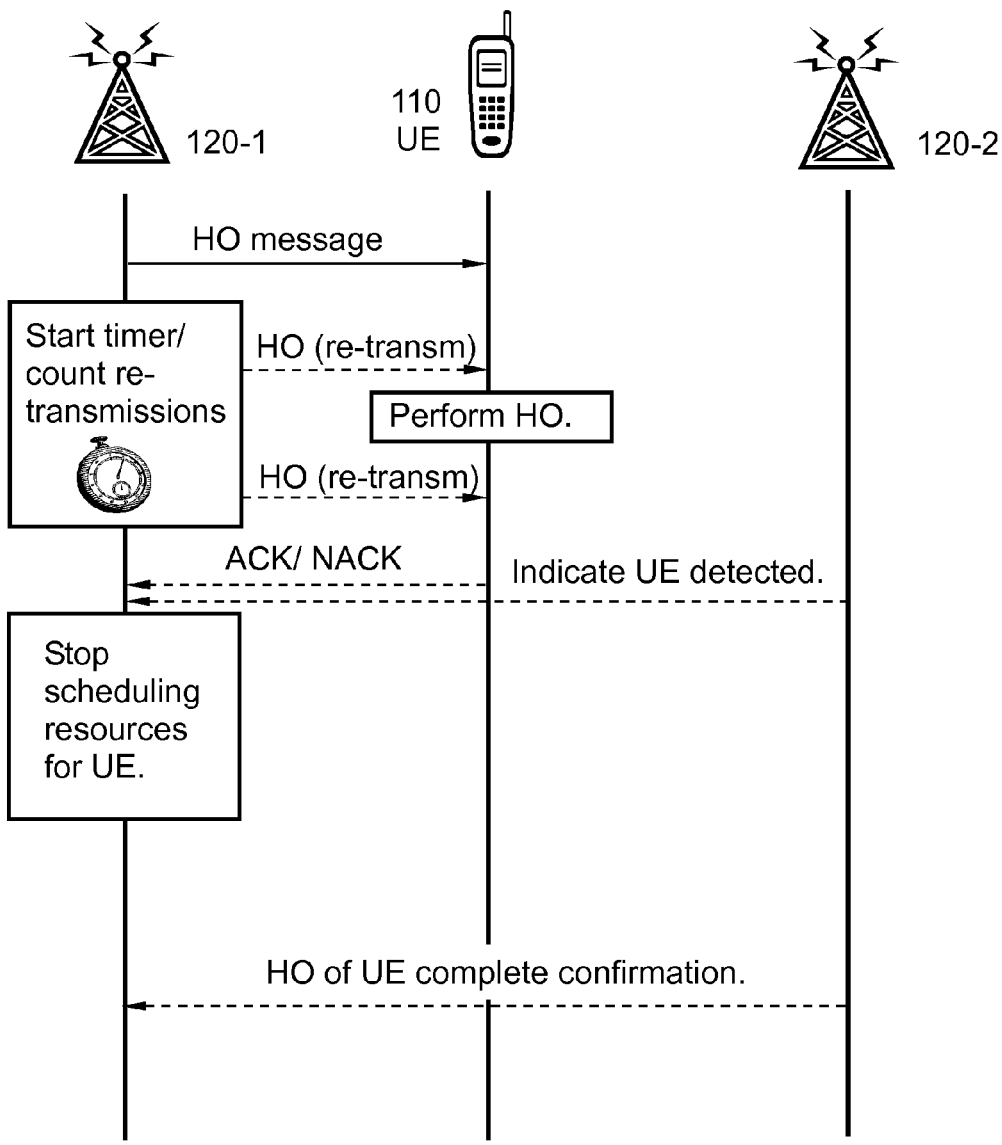
FIG. 4C is a combined block diagram and flow chart illustrating embodiments of the methods.

FIG. 4C is a combined block diagram and flow chart illustrating an embodiment within the wireless communication system 100. The method aims at managing handover of the user equipment 110 from the first network node 120-1, to the second network node 120-2 when the user equipment 110 is moving from a first cell 130-1, defined by the first network node 120-1, into a second cell 130-2, defined by the second network node 120-2. It is to be noted that the first network node 120-1 in such scenario also may be referred to as a source network node 120-1 and the second network node 120-2 may be referred to as a target network node 120-2.

The method may comprise a number of actions, in order to efficiently manage the handover of the user equipment 110 from the first network node 120-1, to the second network node 120-2. The actions may be performed in a somewhat different order than the herein utilised order of appearance, which is merely exemplary according to some embodiments.

The first network node 120-1 may, based on signal measurements previously made by the user equipment 110 and reported to the first network node 120-1, determine that the user equipment 110 is to make a handover from the first network node 120-1 to the second network node 120-2. Having determined that, a handover message is sent from the first network node 120-1 to the user equipment 110. The user equipment 110 may immediately start performing the handover, without transmitting any acknowledgement back to the first network node 120-1, acknowledging the handover message.

At this point, it may not be possible at the first network node 120-1, to know if the user equipment 110 does not transmit any acknowledgement because it has not received or been able to interpret the handover message, or because it has left the first cell 130-1.

Thus the first network node 120-1 may set a timer to a predetermined time and re-transmit the handover message to the user equipment 110, until the timer times out. However, according to some embodiments, the first network node 120-1 may alternatively, or in addition, also set a limit on the number of retransmissions to make, and re-transmit the handover message until the limit is reached, and/or the timer has timed out.

Thereafter, the first network node 120-1 may interrupt scheduling of resources to the user equipment 110 and inhibit further retransmission attempts when either the established limit is reached, or an indication that the user equipment 110 has left the first cell 130-1 and appeared in the second cell 130-2, is received.

Such indication that the user equipment 110 has left the first cell 130-1 and appeared in the second cell 130-2 may comprise a preliminary indication, sent from the user equipment 110, or alternatively from the second network node 120-2, i.e. the target network node 120-2.

Thereby is it rendered possible for the first network node 120-1 to inhibit any retransmission of any handover message to the user equipment 110 and to interrupt scheduling of resources to the user equipment 110, before sending a confirmation of a successfully made handover of the user equipment 110 from the first network node 120-1, to the second network node 120-2.

According to some embodiments, a first and a second timer may be started, where the second timer may expire after the first timer. When the first timer expires, the retransmission to, and scheduling of the user equipment 110 may be stopped. However, if no preliminary indication message has been received when second timer expires, the first network node 120-1 may restart scheduling the user equipment 110. Thereby a situation where the user equipment 110 loose connection when at the cell border 140 may be avoided.

Figure 4D:
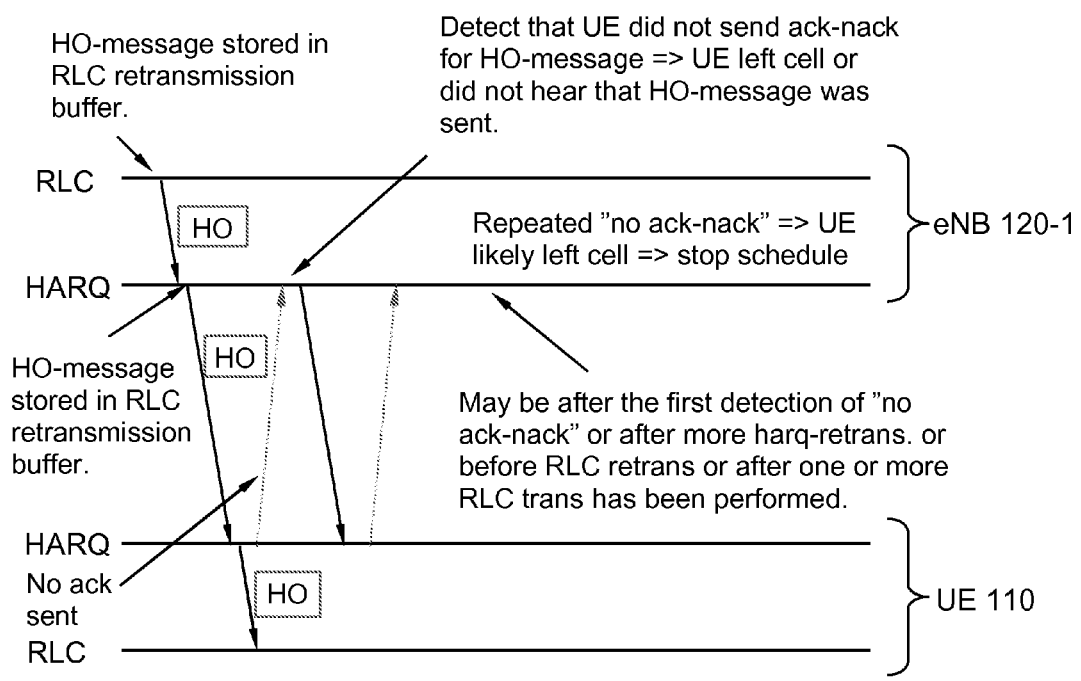
FIG. 4D is a combined block diagram and flow chart illustrating embodiments of the methods.

FIG. 4D is a combined block diagram and flow chart illustrating an embodiment within the wireless communication system 100. The user equipment 110 is here making a handover to the target network node 120-2 without transmitting neither any HARQ acknowledgement, nor any RLC acknowledgement. The first network node 120-1, when having transmitted the handover message to be received by the user equipment 110, detect that the user equipment 110 did not send any acknowledgements for the handover message and conclude that the user equipment 110 either has made the handover and already left the cell 130-1, or did not hear that the handover message was sent. The first network node 120-1 then repeat sending the handover message repeatedly, but if still no acknowledgements for the handover message is received within a limit such as e.g. a time limit, or a defined number of repetitions, such as e.g. 1, 2, 3, . . . , n, where n is an arbitrary integer.

Thereafter, the first network node 120-1 may interrupt scheduling of resources to the user equipment 110 and inhibit further retransmission attempts when either the established limit is reached, or an indication that the user equipment 110 has left the first cell 130-1 and appeared in the second cell 130-2, is received, according to some embodiments.

Figure 4E:
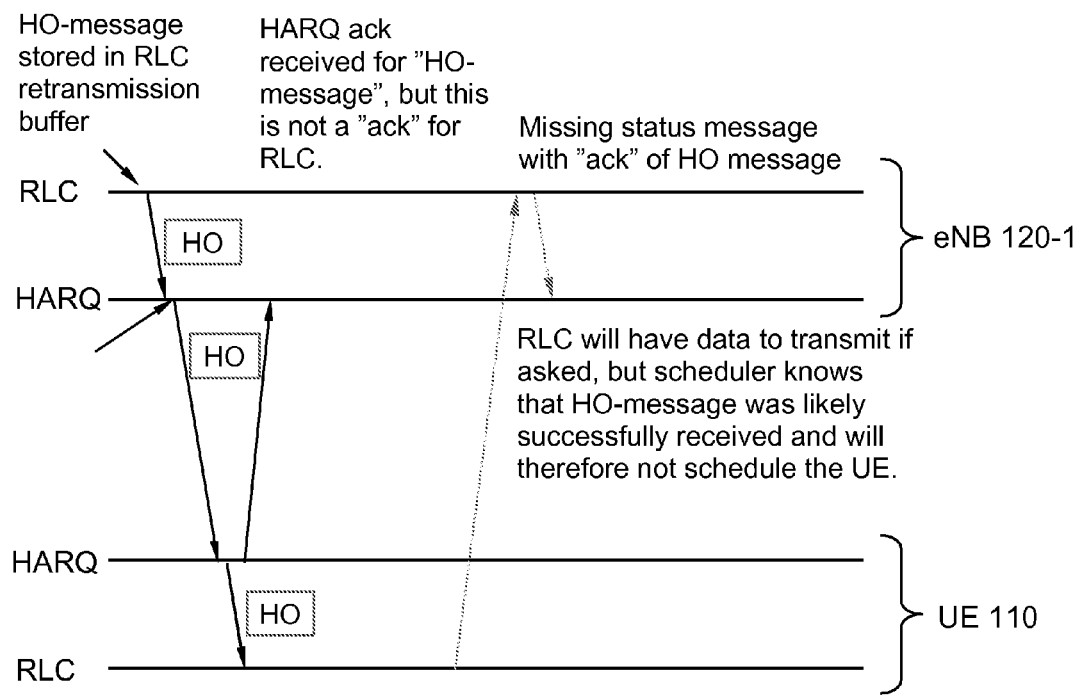
FIG. 4E is a combined block diagram and flow chart illustrating embodiments of the methods.

FIG. 4E is a combined block diagram and flow chart illustrating an embodiment within the wireless communication system 100. The user equipment 110 is here sending a HARQ acknowledgement to the target network node 120-2, acknowledging the handover message but then makes the handover to the target network node 120-2 without transmitting any RLC acknowledgement.

Thus, according to some embodiments, HARQ acknowledgement may be received for the handover message at the first network node 120-1, but without receiving any acknowledgement for RLC. However some entity, such as e.g. scheduler may keep track that possibly all fragments of the handover message was HARQ acknowledged. Thus the first network node 120-1 may interrupt scheduling of resources to the user equipment 110 and inhibit further retransmission attempts.

The RLC may have data to transmit to the user equipment 110 if asked, but the scheduler knows that the handover message was likely to be successfully received by the user equipment 110 and may therefore not schedule the user equipment 110, according to some embodiments.

Figure 5:
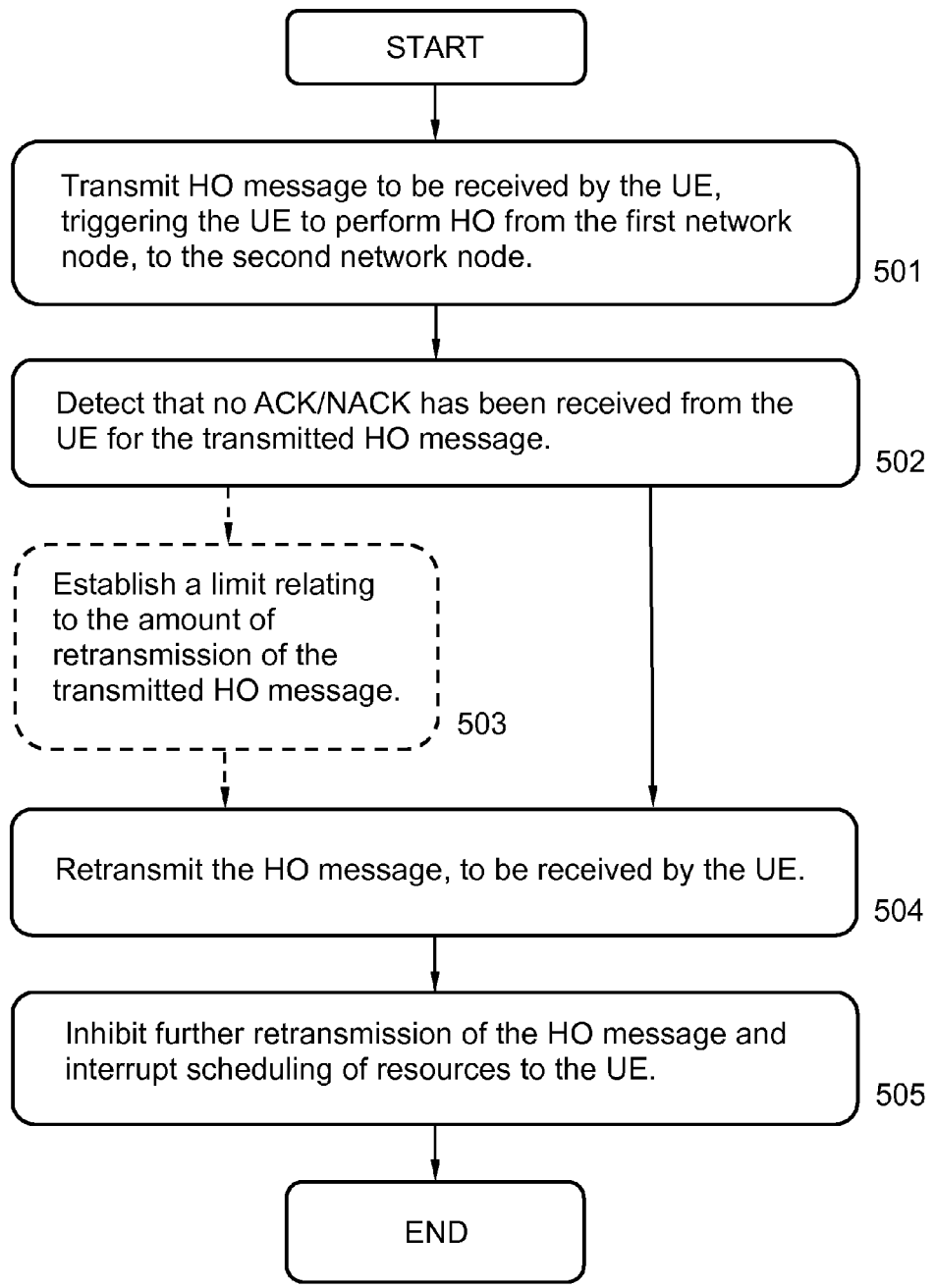
FIG. 5 is a schematic block diagram illustrating a method in a first network node in a wireless communication system according to some embodiments.

FIG. 5 is a schematic block diagram illustrating an embodiment of the present method in a first network node 120-1 in a wireless communication system 100, regarded in perspective of the first network node 120-1. The first network node 120-1 may be represented by a radio base station or the like, or even by a radio base station in conjunction with a base station controller, according to some embodiments wherein some actions may be performed by the base station controller, such as e.g. computations, and some actions by the radio base station, such as e.g. sending and receiving signals. However, the first network node 120-1 may in particular comprise an eNodeB in a 3GPP LTE environment, according to some embodiments.

The method aims at managing handover of a user equipment 110 from the first network node 120-1, to a second network node 120-2 when the user equipment 110 is moving from a first cell 130-1, defined by the first network node 120-1, into a second cell 130-2, defined by the second network node 120-2. The purpose according to some embodiments is to reduce inter-cell interference experienced by the user equipment 110 when entering the target cell 130-2, by eliminating or at least reducing the number of retransmissions of the handover message sent from the first network node 120-1 to be received by the user equipment 110. Further, according to some embodiments the purpose comprises to free radio resources in the first network node 120-1, since unnecessary transmissions to non-present user equipment 110 may be avoided, or at least limited or reduced.

The wireless communication system 100 may be based on the Long-Term Evolution project within the Third Generation Partnership Project, and wherein the first network node 120-1 and the second network node 120-1 may comprise an Evolved Node B (eNodeB or eNB), respectively according to some embodiments.

The first network node 120-1, the second network node 120-2 may be comprised in the wireless communication system 100 in which the user equipment 110 may be situated, wherein the first network node 120-1 may act as serving base station for the user equipment 110, in a handover situation, wherein a handover of the user equipment 110 to the second network node 120-2 is under consideration.

At least two levels of retransmission protocols may be utilized within the wireless communication system 100, according to some embodiments. Those at least two levels of retransmission protocols may comprise e.g. any of a Hybrid Automatic Repeat Request (HARQ) protocol, an Automatic Repeat Request (ARQ) protocol and/or a Radio Link Control (RLC) protocol.

An indication that the user equipment 110 has left the first cell 130-1 and appeared in the second cell 130-2 may alternatively comprise a handover acknowledgement sent by the user equipment 110 over at least one of the retransmission protocols retransmission protocols, but not over all of the retransmission protocols, such as e.g. only over the Hybrid Automatic Repeat Request protocol or the Automatic Repeat Request protocol, but not over the Radio Link Control protocol. Alternatively, the handover acknowledgement may be sent over any other protocol but the Radio Link Control protocol, according to some embodiments.

The method may comprise a number of actions 501-505, in order to efficiently manage handover of the user equipment 110 from the first network node 120-1, to the second network node 120-2 within the wireless communication system 100. The actions may be performed in a somewhat different chronological order than the enumeration indicates, according to different embodiments. It is to be noted that some actions such as e.g. action 503 is performed only within some embodiments. Further, it is to be noted that any, some or all actions, such as e.g. actions 501 and 502 may be performed simultaneously or in a rearranged chronological order. The method may comprise the following actions:

Action 501

A handover message is transmitted by the first network node 120-1, to be received by the user equipment 110. The handover message is triggering the user equipment 110 to perform a handover from the first network node 120-1, to the second network node 120-2.

The transmitted handover message may be divided over one or more lower layer messages, according to some embodiments.

Action 502

It is detected that no acknowledgment message has been received from the user equipment 110, for the transmitted handover message.

The first network node 120-1 knows, or may estimate when any acknowledgment for the transmitted handover message is expected to be received from the user equipment 110.

Action 503

This action is comprised only within some alternative embodiments.

A first limit related to the amount of retransmission to be made of the transmitted handover message may be established. However, according to some embodiments the first limit may be established upon detection 502 that no acknowledgment message has been received from the user equipment 110. According to some embodiments, the first limit may be established at the moment of transmitting 501 the handover message to be received by the user equipment 110.

By establishing the first limit related to the amount of retransmission to be made of the transmitted handover message, redundant retransmissions of the handover message and redundant allocation of system resources may be avoided.

The first limit related to the amount of retransmission to be made of the transmitted handover message may according to some embodiments comprise starting a first timer.

The first limit related to the amount of retransmission to be made of the transmitted handover message may according to some embodiments comprise a limit of the number of retransmissions of the handover message. The first network node 120-1 may interrupt 503 scheduling resources to the user equipment 110 when the established limit of number of retransmissions has been made, according to some embodiments.

Further, according to some embodiments, a second time limit may be established, upon establishing the first limit by starting a second timer 650.

Action 504

The handover message is retransmitted, to be received by the user equipment 110.

According to some embodiments, the handover message may be retransmitted with a certain time interval, which may be preset, or predetermined, or configurable.

The retransmitted handover message may according to some embodiments be divided over one or more lower layer messages, according to some embodiments.

Action 505

Further retransmission of the handover message is inhibited, and also the scheduling of resources to the user equipment 110 is interrupted if either a preliminary indication message, indicating that the user equipment 110 has left the first cell 130-1 and appeared in the second cell 130-2, is received; or a first limit related to an amount of retransmission to be made of the transmitted handover message. The first limit is lower than any other limit related to the amount of retransmission to be made of any other message, not being a handover message is reached. Thereby, the inhibition of further retransmission and interruption of scheduling of resources to the user equipment 110 is enabled, before receiving a confirmation from the second network node 120-2, confirming that the user equipment 110 has successfully completed the handover.

The first limit related to the amount of retransmission to be made of the transmitted handover message may comprise a first time limit according to some embodiments, established by starting a first timer 640. Further retransmission of the handover message may be inhibited, and scheduling of resources to the user equipment 110 may be interrupted when the first timer 640 has expired.

Further, or alternatively, the first limit related to the amount of retransmission to be made of the transmitted handover message may comprise a limit of the number of retransmissions to be made of the handover message. Also, according to some embodiments further retransmission of the handover message may be inhibited and the scheduling of resources to the user equipment 110 may be interrupted when the established limit of number of retransmissions has been made.

The indication that the user equipment 110 has left the first cell 130-1 and appeared in the second cell 130-2 may comprise a preliminary indication message sent by the second network node 120-2 according to some embodiments, triggering the first network node 120-1 to interrupt scheduling the user equipment 110.

However, the indication that the user equipment has left the first cell 130-1 and appeared in the second cell 130-2 may according to some embodiments comprise an acknowledgement message sent by the user equipment 110, to be received by the first network node 120-1.

In addition, according to some alternative embodiments, further retransmission of the handover message may be inhibited and scheduling of resources to the user equipment 110 may be interrupted only if both the preliminary indication message, indicating that the user equipment 110 has left the first cell 130-1 and appeared in the second cell 130-2, is received; and also the first limit related to the amount of retransmission to be made of the transmitted handover message, which first limit is lower than any other limit related to the amount of retransmission to be made of any other message, not being a handover message is reached. Thereby the inhibition of further retransmission and interruption of scheduling of resources to the user equipment 110 may be enabled, before receiving the confirmation from the second network node 120-2, confirming that the user equipment 110 has successfully completed the handover.

Further, according to some embodiments wherein the second time limit may be established, upon establishing the first limit by starting the second timer 650 may, if no preliminary indication message has been received when the second timer 650 expires. Also, some embodiments may comprise restarting retransmission of the handover message and scheduling of resources to the user equipment 110.

The retransmitted handover message may according to some embodiments be divided over one or more lower layer messages, according to some embodiments.

Thereby, according to some embodiments, an enhanced system performance and also reduced inter-cell interference may be provided.

Figure 6:
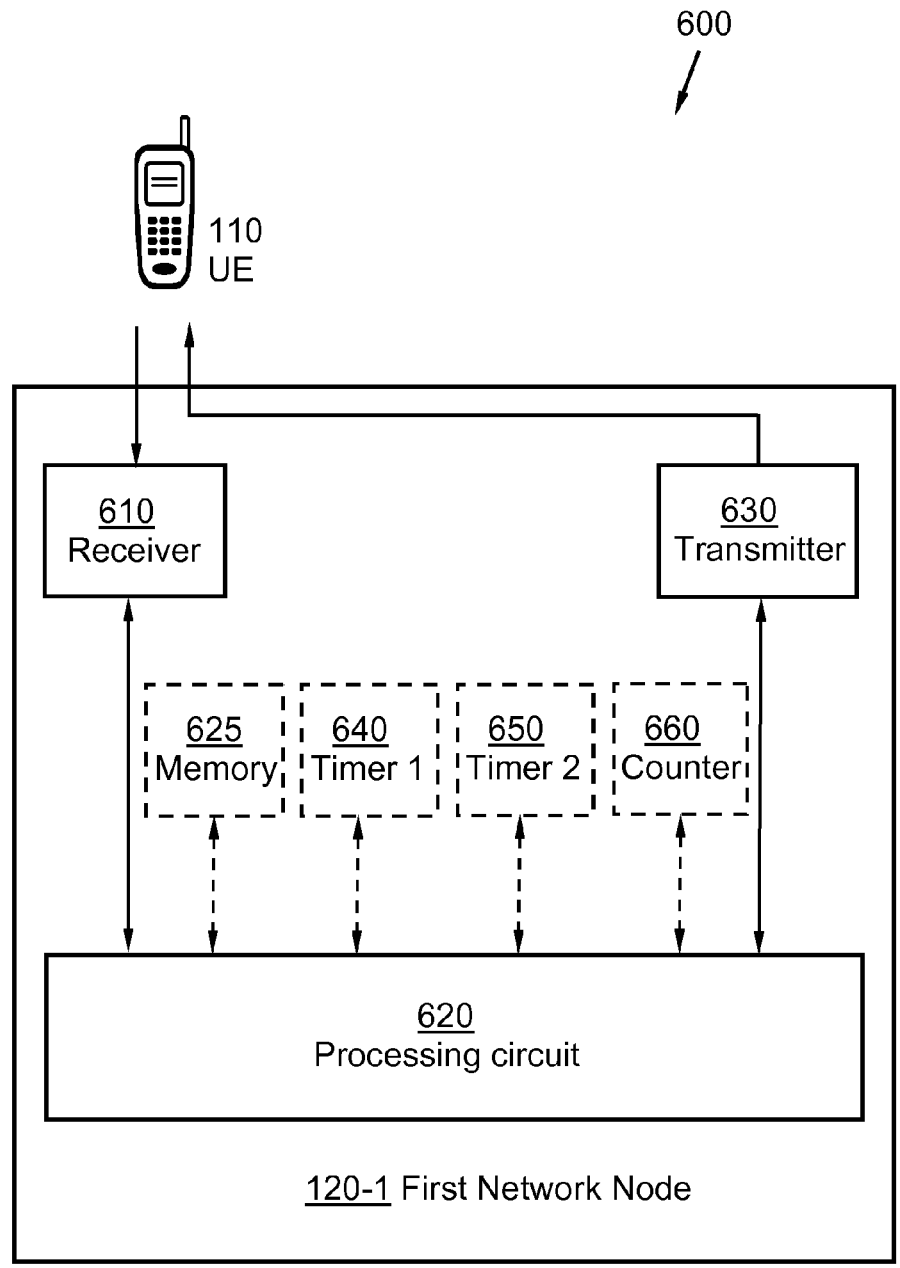
FIG. 6 is a schematic block diagram illustrating an arrangement in a first network node in a wireless communication system according to some embodiments.

FIG. 6 is a schematic block diagram illustrating an arrangement 600 in a first network node 120-1 in a wireless communication system 100. The first network node 120-1 may be represented by a radio base station or the like, or even by a radio base station in conjunction with a base station controller, according to some embodiments wherein some actions may be performed by the base station controller, such as e.g. computations, and some actions by the radio base station, such as e.g. sending and receiving signals. However, the first network node 120-1 may in particular comprise an eNodeB in a 3GPP LTE environment, according to some embodiments.

The network node arrangement 600 is configured to perform any, some or all of the actions 501-505 for managing handover of a user equipment 110 from the first network node 120-1, to a second network node 120-2 when the user equipment 110 is moving from a first cell 130-1, defined by the first network node 120-1, into a second cell 130-2, defined by the second network node 120-2. The purpose according to some embodiments is to reduce inter-cell interference experienced by the user equipment 110 when entering the target cell 130-2, by eliminating or at least reducing the number of retransmissions of the handover message sent from the first network node 120-1 to be received by the user equipment 110. Further, according to some embodiments the purpose comprises to free radio resources in the first network node 120-1, since unnecessary transmissions to non-present user equipment 110 may be avoided, or at least limited or reduced.

The wireless communication system 100 may be based on the Long-Term Evolution project within the Third Generation Partnership Project, and wherein the first network node 120-1 and the second network node 120-1 may comprise an Evolved Node B (eNodeB or eNB), respectively according to some embodiments.

The first network node 120-1, the second network node 120-2 may be comprised in the wireless communication system 100 in which the user equipment 110 may be situated, wherein the first network node 120-1 may act as serving base station for the user equipment 110, in a handover situation, wherein a handover of the user equipment 110 to the second network node 120-2 is under consideration.

For enhanced clarity, any internal electronics or other components of the arrangement 600, which are irrelevant for understanding embodiments of the herein disclosed methods, have been omitted from FIG. 6.

In order to perform the actions 501-505 correctly, the arrangement 600 comprises a transmitter 630, configured to transmit a handover message to be received by the user equipment 110. The transmitted handover message is in turn configured to trigger the user equipment 110 to perform the handover from the first network node 120-1, to the second network node 120-2.

Further, the arrangement 600 comprises receiver 610. The receiver 610 is configured to receive an indication that the user equipment 110 has left the first cell 130-1 and appeared in the second cell 130-2.

Also, the arrangement 600 furthermore comprises a receiver 610. The receiver 610 is configured to receive a preliminary indication message, indicating that the user equipment 110 has left the first cell 130-1 and appeared in the second cell 130-2.

In addition, the arrangement 600 also comprises a processing circuit 620, configured to detect that no acknowledgment message has been received from the user equipment 110, for the transmitted handover message. The processing circuit 620 is furthermore configured to inhibit further retransmission of the handover message and interrupt scheduling of resources to the user equipment 110, if either a preliminary indication message, indicating that the user equipment 110 has left the first cell 130-1 and appeared in the second cell 130-2, is received; or a first limit related to an amount of retransmission to be made of the transmitted handover message, which first limit is lower than any other limit related to the amount of retransmission to be made of any other message, not being a handover message is reached, such that the inhibition of further retransmission and interruption of scheduling of resources to the user equipment 110 is enabled, before receiving a confirmation from the second network node 120-2, confirming that the user equipment 110 has successfully completed the handover.

Furthermore, the processing circuit 620 may also be configured to establish the first limit related to the amount of retransmission to be made of the transmitted handover message, upon detection that no acknowledgment message has been received from the user equipment 110 according to some embodiments.

Additionally, the processing circuit 620 may further be configured to inhibit further retransmission of the handover message and interrupt scheduling of resources to the user equipment 110 when the first timer 640 has expired.

Also, the arrangement 600 may further comprise a first timer 640. Further, the arrangement 600 may also, according to some embodiments, comprise a second timer 650.

The processing circuit 620 may furthermore also be configured to establish a second time limit, upon establishing the first limit, by starting the second timer 650. Further, the processing circuit 620 may also be configured to restart retransmission of the handover message and scheduling of resources to the user equipment 110, if no preliminary indication message has been received when the second timer 650 expires.

The processing circuit 620 may comprise e.g. one or more instances of a Central Processing Unit (CPU), a processing unit, a processor, a microprocessor, or other processing logic that may interpret and execute instructions. The processing circuit 620 may further perform data processing functions for inputting, outputting, and processing of data comprising data buffering and device control functions, such as call processing control, user interface control, or the like.

According to some alternative embodiments, the arrangement 600 may also comprise a counter 660. The counter 660 may be configured to be started at the moment of transmitting the handover message to be received by the user equipment 110. The counter 660 may in addition be configured to count the number of retransmissions of the handover message, according to some embodiments. The processing circuit 620 may further be configured to inhibit further retransmission of the handover message and interrupt scheduling of resources to the user equipment 110 when the counted number of retransmissions reaches an established limit of number of retransmissions. Thus, thereby, the processing circuit 620 may further alternatively be configured to interrupt scheduling resources for the user equipment 110 when the counter 660 has expired, according to some embodiments.

According to some further embodiments, the arrangement 600 may comprise at least one memory 625. The memory 625 may comprise a physical device utilized to store data or programs i.e. sequences of instructions, on a temporary or permanent basis. According to some embodiments, the memory 625 may comprise integrated circuits consisting of silicon-based transistors. Further, the at least one memory 625 may be volatile or non-volatile. Thus the arrangement 600 may comprise at least one volatile memory 625 and also at least one non-volatile memory 625 according to some embodiments.

Further, it is to be noted that some of the described units 610-660 comprised within the arrangement 600 in the first network node 120-1 are to be regarded as separate logical entities but not with necessity separate physical entities. To mention just one example, the receiver 610 and the transmitter 630 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the first network node 120-1, and the user equipment 110 may comprise both traffic and control signals e.g. paging signals/messages for incoming calls, which may be used to establish and maintain a voice call communication with another party or to transmit and/or receive data, such as SMS, e-mail or MMS messages, with a remote user equipment, or other node comprised in the wireless communication system 100.

The described actions 501-505 to be performed in the first network node 120-1 may be implemented through one or more processing circuits 620 in the first network node 120-1, together with computer program code for performing the functions of the actions 501-505. Thus a computer program product, comprising instructions for performing any, some or all of the actions 501-505 in the first network node 120-1 may manage the handover of the user equipment 110 from the first network node 120-1, to the second network node 120-2 when the user equipment 110 is moving from the first cell 130-1, defined by the first network node 120-1, into the second cell 130-2, defined by the second network node 120-2, when being loaded into the one or more processing circuits 620.

The computer program product mentioned above may be provided for instance in the form of a data carrier, or a non-transitory computer readable medium carrying computer program code for performing at least some of the actions 501-505 according to some embodiments when being loaded into the processing circuit 620. The data carrier or non-transitory computer readable medium may comprise e.g. a hard disk, a CD ROM disc, a memory stick, an optical storage device, a magnetic storage device or any other appropriate medium that is configured to hold machine readable data. The computer program product may furthermore be provided as computer program code on a server and downloaded to the first network node 120-1 remotely, e.g. over an Internet or an intranet connection.

Figure 7:
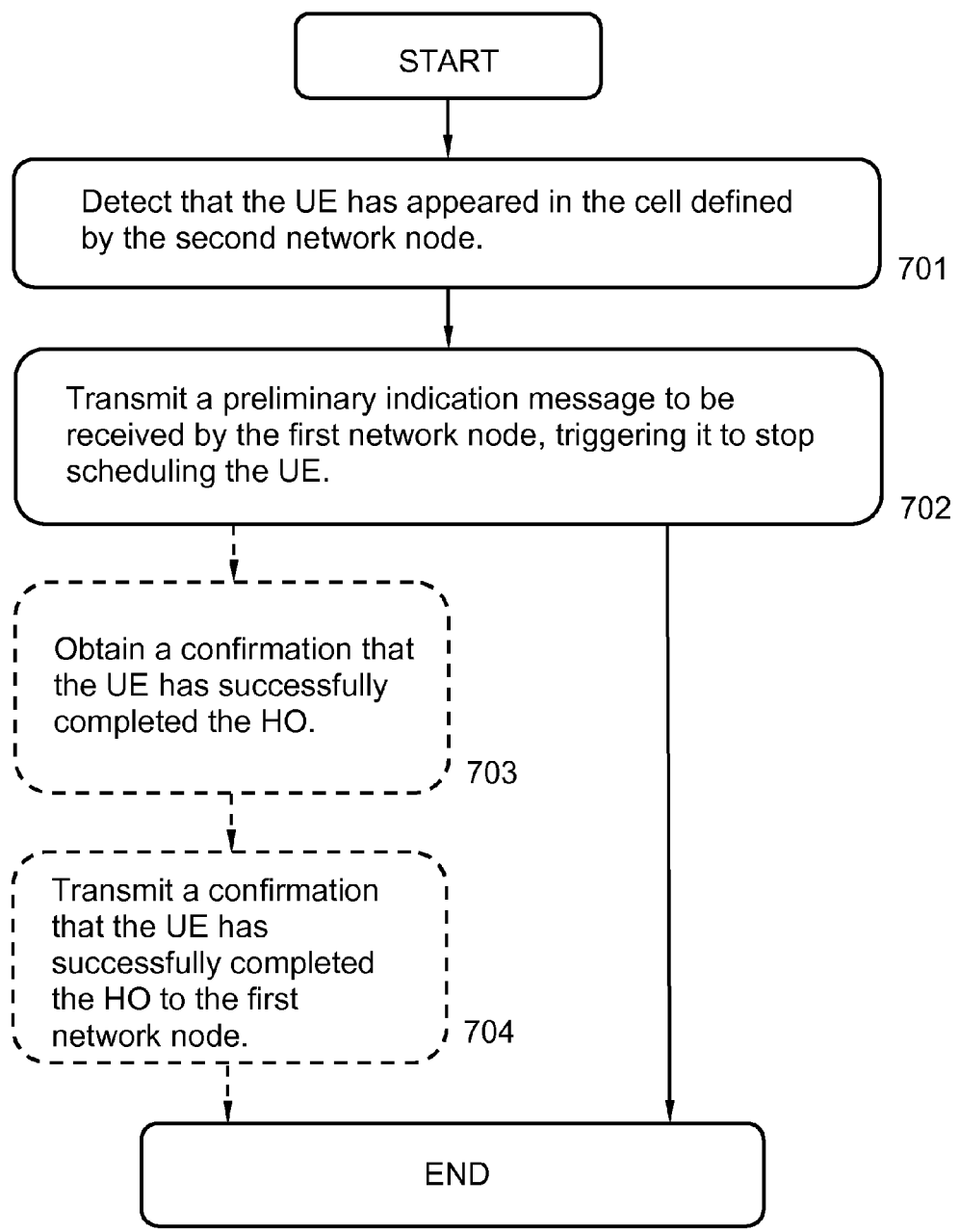
FIG. 7 is a schematic block diagram illustrating a method in a second network node in a wireless communication system according to some embodiments.

FIG. 7 is a schematic block diagram illustrating an embodiment of the present method in a second network node 120-2, regarded in perspective of the second network node 120-2. The method aims at facilitating the performance of a handover of a user equipment 110 from a first network node 120-1, to the second network node 120-2 when the user equipment 110 is moving from a first cell 130-1, defined by the first network node 120-1, into a second cell 130-2, defined by the second network node 120-2.

The wireless communication system 100 may be based on the Long-Term Evolution project within the Third Generation Partnership Project, and wherein the first network node 120-1 and the second network node 120-1 may comprise an Evolved Node B (eNodeB or eNB), respectively according to some embodiments.

The first network node 120-1, the second network node 120-2 may be comprised in the wireless communication system 100 in which the user equipment 110 may be situated, wherein the first network node 120-1 may act as serving base station for the user equipment 110, in a handover situation, wherein a handover of the user equipment 110 to the second network node 120-2 is under consideration.

The method may comprise a number of actions 701-704, in order to correctly facilitate the handover. The actions may be performed in another chronological order than the enumeration indicates, according to different embodiments. The actions may further be performed simultaneously. It is further to be noted that some actions 703-704 may be performed within some alternative embodiments. The method may comprise the following actions:

Action 701

The second network node 120-2 detects that the user equipment 110 has appeared in the second cell 130-2, which is defined by the second network node 120-2.

The second network node 120-2 may for example receive random access signalling from the user equipment 110, or control signalling such as e.g. a Sounding Reference Signal (SRS) according to some embodiments.

Action 702

A preliminary indication message is transmitted, to be received by the first network node 120-1. The transmitted message indicates that the user equipment 110 has appeared in the second cell 130-2. Further, the preliminary indication message is configured to triggered the first network node 120-1 to inhibit any retransmission of any handover message to the user equipment 110, and interrupt scheduling of resources to the user equipment 110, before sending a confirmation of a successfully made handover of the user equipment 110 from the first network node 120-1, to the second network node 120-2.

Thus, the transmitted message triggers the first network node 120-1 to stop scheduling the user equipment 110, before sending a confirmation of a successfully made handover of the user equipment 110 from a first network node 120-1, to the second network node 120-2, such as i.e. a UE context release message, or any other similar confirmation of successful handover.

The preliminary indication message may thus comprise a preliminary indication that the user equipment 110 has left the first cell 130-1 and appeared in the second cell 130-2.

The preliminary indication message transmitted from the second network node 120-2 to the first network node 120-1 may be transmitted over an X2 intra base station interface, according to some embodiments.

By triggering the first network node 120-1 to inhibit further retransmissions of handover messages at the first network node 120-1, intra-cell interference between the cells 130-1, 130-2 is eliminated or at least somewhat reduced, as redundant retransmissions by the first network node 120-1 may be inhibited earlier than otherwise.

By triggering the first network node 120-1 to stop scheduling the user equipment 110, resources are saved, which resources may be used for other purpose, such as e.g. scheduling other user equipment.

Action 703

This action is comprised only within some alternative embodiments.

A confirmation may be obtained, confirming that the user equipment 110 has successfully completed the handover from the first network node 120-1, to the second network node 120-2.

The obtained confirmation may comprise e.g. a random access from the user equipment 110, according to some embodiments.

Action 704

This action is comprised only within some alternative embodiments.

A confirmation of the successfully made handover of the user equipment 110 from the first network node 120-1, to the second network node 120-2, such as i.e. a UE context release message, is transmitted, to be received by the first network node 120-1. The confirmation may however comprise any other format, to be interpreted by the first network node 120-1 to release the user equipment 110 and stop scheduling the user equipment 110.

Figure 8:
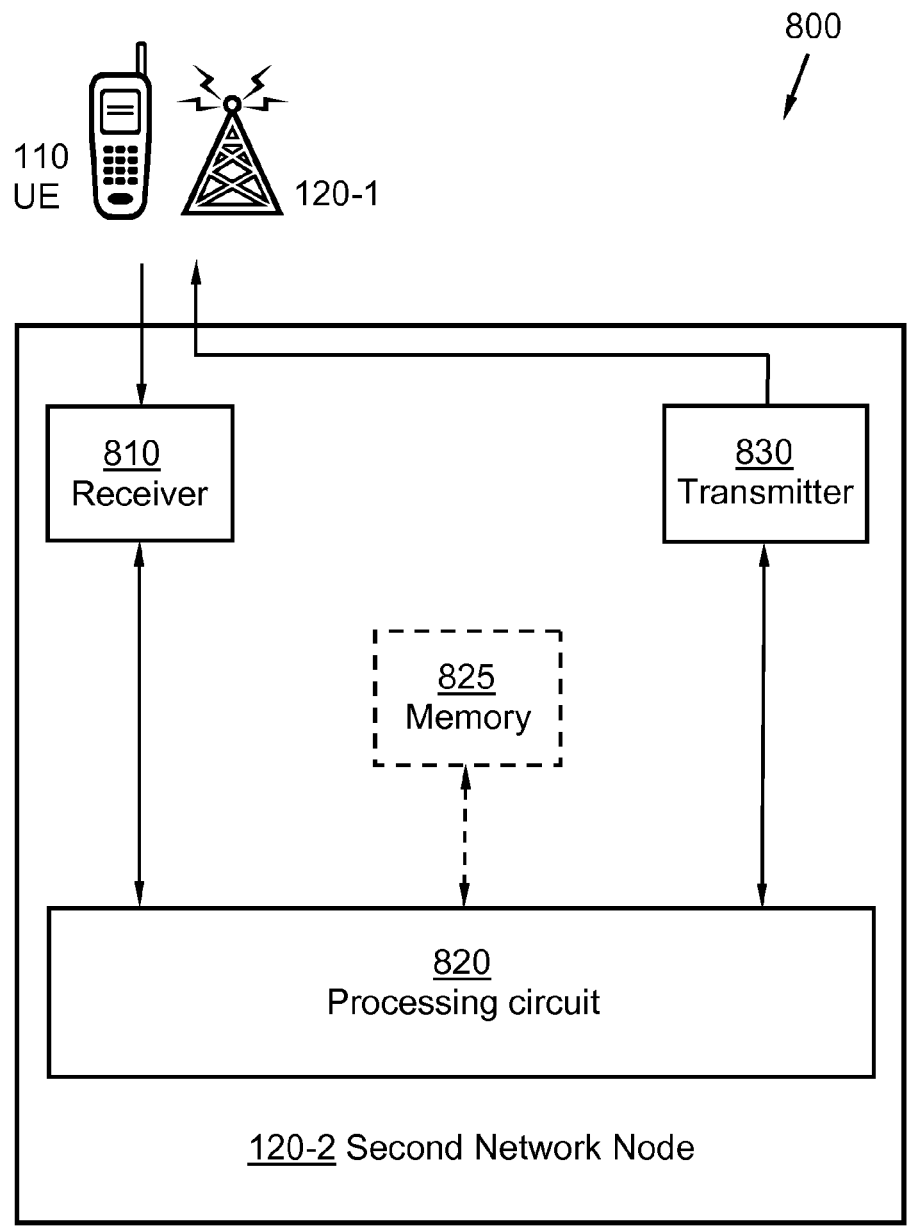
FIG. 8 is a schematic block diagram illustrating an arrangement in a second network node in a wireless communication system according to some embodiments.

FIG. 8 is a block diagram schematically illustrating an arrangement 800 in a second network node 120-2. The purpose of the arrangement 800 is to facilitate the performance of a handover of a user equipment 110 from a first network node 120-1, to the second network node 120-2 when the user equipment 110 is moving from a first cell 130-1, defined by the first network node 120-1, into a second cell 130-2, defined by the second network node 120-2.

The wireless communication system 100 may be based on the Long-Term Evolution project within the Third Generation Partnership Project, and wherein the first network node 120-1 and the second network node 120-1 may comprise an Evolved Node B (eNodeB or eNB), respectively according to some embodiments.

The first network node 120-1, the second network node 120-2 may be comprised in the wireless communication system 100 in which the user equipment 110 may be situated, wherein the first network node 120-1 may act as serving base station for the user equipment 110, in a handover situation, wherein a handover of the user equipment 110 to the second network node 120-2 is under consideration.

The arrangement 800 is configured to perform at least some of the actions 701-704 for facilitating the performance of the handover of a user equipment 110 from a first network node 120-1, to the second network node 120-2.

For enhanced clarity, any internal electronics or other components of the arrangement 800, which are irrelevant for understanding embodiments of the herein disclosed methods, have been omitted from FIG. 8.

In order to perform the actions 701-704 correctly, the arrangement 800 comprises a processing circuit 820, configured to detect that the user equipment 110 has appeared in the cell 130-2 defined by the second node 120-2.

The processing circuit 820 may comprise e.g. one or more instances of a Central Processing Unit (CPU), a processing unit, a processor, a microprocessor, or other processing logic that may interpret and execute instructions. The processing circuit 820 may further perform data processing functions for inputting, outputting, and processing of data comprising data buffering and device control functions, such as call processing control, user interface control, or the like.

Further, the arrangement 800 comprises a transmitter 830. The transmitter 830 is configured to transmit a preliminary indication message to be received by the first network node 120-1, which preliminary indication message in turn may trigger the first network node 120-1 to inhibit any retransmission of any handover message to the user equipment 110, and interrupt scheduling of resources to the user equipment 110, before sending a confirmation of a successfully made handover of the user equipment 110 from the first network node 120-1, to the second network node 120-2.

Furthermore, according to some embodiments, the arrangement 800 may also comprise at least one memory 825.

The memory 825 may comprise a physical device utilized to store data or programs i.e. sequences of instructions, on a temporary, or permanent basis. According to some embodiments, the memory 825 may comprise integrated circuits consisting of silicon-based transistors. Further, the at least one memory 825 may be volatile or non-volatile. Thus the arrangement 800 may comprise at least one volatile memory 825 and also at least one non-volatile memory 825 according to some embodiments.

Further, it is to be noted that some of the described units 810-830 comprised within the arrangement 800 in the second network node 120-2 are to be regarded as separate logical entities but not with necessity separate physical entities. To mention just one example, the receiver 810 and the transmitter 830 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the second network node 120-2, and the user equipment 110 may comprise both traffic and control signals e.g. paging signals/messages for incoming calls, which may be used to establish and maintain a voice call communication with another party or to transmit and/or receive data, such as SMS, e-mail or MMS messages, with a remote user equipment, or other node comprised in the wireless communication system 100. The second network node 120-2 may further be configured to communicate with the first network node 120-1 over an inter-base station interface such as X2.

The X2 Application Protocol may be used on the control plane between the first network node 120-1 and the second network node 120-2 on the X2 interface. It is used for signalling about the X2 bearer set-up and forwarding of user equipment context during handover.

The described actions 701-704 to be performed in the second network node 120-2 may be implemented through one or more processing circuits 820 in the second network node 120-2, together with computer program code for performing the functions of the actions 701-704. Thus a computer program product, comprising instructions for performing any, some or all of the actions 701-704 in the second network node 120-2 may facilitate the handover of the user equipment 110 from the first network node 120-1, to the second network node 120-2 when the user equipment 110 is moving from the first cell 130-1, defined by the first network node 120-1, into the second cell 130-2, defined by the second network node 120-2, when being loaded into the one or more processing circuits 820.

The computer program product mentioned above may be provided for instance in the form of a data carrier, or a non-transitory computer readable medium carrying computer program code for performing at least some of the actions 701-704 according to some embodiments when being loaded into the processing circuit 820. The data carrier or non-transitory computer readable medium may comprise e.g. a hard disk, a CD ROM disc, a memory stick, an optical storage device, a magnetic storage device or any other appropriate medium that is configured to hold machine readable data. The computer program product may furthermore be provided as computer program code on a server and downloaded to the second network node 120-2 remotely, e.g. over an Internet or an intranet connection.

The terminology used in the disclosure of the exemplary embodiments illustrated in the accompanying drawings is not intended to be limiting of the present methods and nodes.

As used herein, the singular forms "a", an and "the" are intended to comprise the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it may be directly connected or coupled to the other element or intervening elements may be present. Furthermore, "connected" or "coupled" as used herein may comprise wirelessly connected or coupled. As used herein, the term "and/or" includes any and all combinations of one or more of the associated listed items.

The invention claimed is:

1. A method in a first network node in a wireless communication system for managing handover of a user equipment from the first network node, to a second network node when the user equipment is moving from a first cell, defined by the first network node, into a second cell, defined by the second network node, the method comprising:
transmitting a handover message, to be received by the user equipment, to trigger the user equipment to perform a handover from the first network node to the second network node;
detecting that no acknowledgment message has been received from the user equipment, for the transmitted handover message;
retransmitting the handover message, to be received by the user equipment; and
inhibiting further retransmission of the handover message and interrupting scheduling of resources to the user equipment, before receiving a confirmation of successful handover of the user equipment from the second network node, if either of the following occurs:
a preliminary indication message is received, indicating that the user equipment has left the first cell and appeared in the second cell; or
a first limit is reached, wherein the first limit is related to an amount of retransmission to be made of the transmitted handover message, which first limit is lower than any other limit related to the amount of retransmission to be made of any other message, not being a handover message.

2. The method according to claim 1, further comprising establishing the first limit upon detection that no acknowledgment message has been received from the user equipment.

3. The method according to claim 1, wherein the first limit comprises a first time limit, established by starting a first timer, and wherein further retransmission of the handover message is inhibited and scheduling of resources to the user equipment is interrupted, when the first timer has expired.

4. The method according to claim 1, wherein the first limit comprises a limit on the number of retransmissions to be made of the handover message, and wherein further retransmission of the handover message is inhibited and scheduling of resources to the user equipment is interrupted, when the established limit on the number of retransmissions has been reached.

5. The method according to claim 1, wherein further retransmission of the handover message is inhibited and scheduling of resources to the user equipment is interrupted only if both the preliminary indication message is received and the first limit is reached.

6. The method according to claim 1, further comprising establishing a second time limit upon establishing the first limit, by starting a second timer restarting retransmission of the handover message and scheduling of resources to the user equipment if the preliminary indication message has not been received when the second timer expires.

7. The method according to claim 1, wherein at least two levels of retransmission protocols are utilized within the wireless communication system, and wherein the preliminary indication message comprises a handover acknowledgement sent by the user equipment over at least one of the retransmission protocols, but not over all of the retransmission protocols.

8. The method according to claim 7, wherein the at least two levels of retransmission protocols comprise any of a Hybrid Automatic Repeat Request protocol, an Automatic Repeat Request protocol and a Radio Link Control protocol, and wherein the preliminary indication message comprises a handover acknowledgement sent by the user equipment over any other protocol but the Radio Link Control protocol.

9. The method according to claim 1, wherein the preliminary indication message is transmitted by the second network node.

10. The method according to claim 1, wherein the wireless communication system is based on the Long-Term Evolution project within the Third Generation Partnership Project, and wherein the first network node and the second network node each comprise an Evolved Node B.

11. An arrangement configured for managing handover of a user equipment from a first network node to a second network node in a wireless communication system, when the user equipment is moving from a first cell defined by the first network node and into a second cell defined by the second network node, the arrangement being included in the first network node and comprising:
a transmitter, configured to transmit a handover message to be received by the user equipment, to trigger the user equipment to perform a handover from the first network node, to the second network node;
a processing circuit, configured to:
detect that no acknowledgment message has been received from the user equipment, for the transmitted handover message; and
inhibit further retransmission of the handover message and interrupt scheduling of resources to the user equipment, before receiving any confirmation of successful handover of the user equipment from the second network node, if either of the following occurs:
a preliminary indication message is received, indicating that the user equipment has left the first cell and appeared in the second cell; or
a first limit is reached, wherein the first limit is related to an amount of retransmission to be made of the transmitted handover message, which first limit is lower than any other limit related to the amount of retransmission to be made of any other message, not being a handover message; and
a receiver configured to receive the preliminary indication message.

12. The arrangement according to claim 11, wherein the processing circuit is further configured to establish the first limit upon detection that the acknowledgment message has not been received from the user equipment.

13. The arrangement according to claim 11, further comprising a first timer, and wherein the processing circuit is configured to inhibit further retransmission of the handover message and interrupt scheduling of resources to the user equipment when the first timer has expired.

14. The arrangement according to claim 11, further comprising a second timer, and wherein the processing circuit is configured to establish a second time limit by starting the second timer upon establishing the first limit, and to restart retransmission of the handover message and scheduling of resources to the user equipment, if the preliminary indication message has not been received when the second timer expires.

15. The arrangement according to claim 11, further comprising a counter, which counter is configured to count the number of retransmissions of the transmitted handover message, and wherein the processing circuit is configured to inhibit further retransmission of the handover message and interrupt scheduling of resources to the user equipment when the counted number of retransmissions reaches an established limit.

16. A method in a second network node in a wireless communication system, for handover of a user equipment from a first network node to the second network node when the user equipment is moving from a first cell defined by the first network node and into a second cell defined by the second network node, wherein the method comprises:
   detecting that the user equipment has appeared in the second cell; and
   transmitting, before sending any confirmation of successful handover of the user equipment to the second network node, a preliminary indication message to be received by the first network node, indicating that the user equipment has appeared in the second cell and triggering the first network node to inhibit any retransmission of any handover message to the user equipment and interrupt scheduling of resources to the user equipment.

17. An arrangement configured for managing handover a user equipment from a first network node to a second network node in a wireless communication network, when the user equipment is moving from a first cell defined by the first network node and into a second cell defined by the second network node, the arrangement being included in the second network node and comprising:
   a transmitter; and
   a processing circuit configured to:
   detect that the user equipment has appeared in the second cell and, in response to said detection and before sending any confirmation of successful handover of the user equipment to the second network node, transmit a preliminary indication message to the first network node via said transmitter, indicating that the user equipment has appeared in the second cell and triggering the first network node to inhibit any retransmission of any handover message to the user equipment and interrupt scheduling of resources to the user equipment.

* * * * *